United States Patent
Suzuki et al.

(10) Patent No.: US 11,729,103 B2
(45) Date of Patent: Aug. 15, 2023

(54) ESTIMATION METHOD, ESTIMATION DEVICE, AND ESTIMATION PROGRAM

(71) Applicant: NIPPON TELEGRAPH AND TELEPHONE CORPORATION, Tokyo (JP)

(72) Inventors: Hiroshi Suzuki, Tokyo (JP); Yuhei Hayashi, Tokyo (JP); Yuki Miyoshi, Tokyo (JP); Takeaki Nishioka, Tokyo (JP); Hiroshi Osawa, Tokyo (JP); Ichiro Kudo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 17/270,345

(22) PCT Filed: Aug. 16, 2019

(86) PCT No.: PCT/JP2019/032172
§ 371 (c)(1),
(2) Date: Feb. 22, 2021

(87) PCT Pub. No.: WO2020/040060
PCT Pub. Date: Feb. 27, 2020

(65) Prior Publication Data
US 2021/0328932 A1    Oct. 21, 2021

(30) Foreign Application Priority Data

Aug. 24, 2018  (JP) .................................. 2018-157459

(51) Int. Cl.
*H04L 47/20* (2022.01)
*H04L 41/0213* (2022.01)
(Continued)

(52) U.S. Cl.
CPC .......... *H04L 47/20* (2013.01); *H04L 41/0213* (2013.01); *H04L 43/0894* (2013.01); *H04L 47/225* (2013.01); *H04L 63/1408* (2013.01)

(58) Field of Classification Search
CPC . H04L 47/20; H04L 41/0213; H04L 43/0894; H04L 47/225; H04L 43/026;
(Continued)

(56) References Cited

U.S. PATENT DOCUMENTS

| 9,887,932 B1* | 2/2018 | Uppal ..................... H04L 47/76 |
| 2006/0230167 A1* | 10/2006 | Watanabe ............... H04L 43/00 709/230 |
| 2018/0145891 A1* | 5/2018 | Wang .................. H04L 47/2441 |

OTHER PUBLICATIONS

Suzuki et al. (2018) "A Determining Method of Sampling Rate for Detecting Cyber Attacks," Institute of Electronics, Information and Communication Engineers, Mar. 2018.
(Continued)

*Primary Examiner* — Nishant Divecha

(57) ABSTRACT

The controller (10) acquires information about the band of the flow within the tunnel and the band of each flow after policing or shaping, calculates the ratio of the traffic volume after policing or shaping to the traffic volume before policing or shaping by using the acquired information about the band, and estimates the traffic volume of the flow to be monitored within the tunnel by using the calculated ratio and the band of each flow after policing or shaping.

20 Claims, 22 Drawing Sheets

(51) Int. Cl.
*H04L 43/0894* (2022.01)
*H04L 47/22* (2022.01)
*H04L 9/40* (2022.01)

(58) Field of Classification Search
CPC .. H04L 43/0876; H04L 47/22; H04L 63/1408
See application file for complete search history.

(56) References Cited

OTHER PUBLICATIONS

Hayashi et al. (2018) "Computational complexity evaluation of high-speed discrimination method for various protocol stacks," Institute of Electronics, Information and Communication Engineers, Mar. 2018.

Suzuki et al. (2018) "A method of estimating the amount of traffic from copy packets for attack detection," IEICE 2018 Communication Society Conference Proceedings 2, Sep. 11, 2018, p. 65.

* cited by examiner

ESTIMATION METHOD, ESTIMATION DEVICE, AND ESTIMATION PROGRAM

CROSS-REFERENCE TO RELATED APPLICATIONS

This application is a U.S. 371 application of International Patent Application No. PCT/JP2019/032172, filed on 16 Aug. 2019, which application claims priority to and the benefit of JP Application No. 2018-157459, filed on 24 Aug. 2018, the disclosures of which are hereby incorporated herein by reference in their entireties.

TECHNICAL FIELD

The present invention relates to an estimation method, an estimation apparatus, and an estimation program.

BACKGROUND ART

There is known a technique for networks using tunneling, of copying packets transmitted and received through a tunnel, collecting copied packets on an analysis site, and monitoring traffic of a flow within the tunnel. In networks using tunneling technology, traffic can be drawn into the analysis site only in units of tunnels, which may cause excessive use of the band and congestion of the analysis site. Therefore, to draw traffic in units of tunnels into the analysis site, a method of copying packets at a preset sampling rate and a method of performing band control (policing or shaping) are employed.

CITATION LIST

Non Patent Literature

Non Patent Literature 1: Hiroshi Suzuki, Yuhei Hayashi, Takero Nishioka, Katsuhiko Sakai, Ichiro Kudo, "Sampling Rate Determination Method for Detection of Attack", The Institute of Electronics, Information and Communication Engineers, March, 2018 Non Patent Literature 2: Yuhei Hayashi, Ichiro Kudo, Hiroshi Suzuki, Satoshi Nishiyama, "Evaluation of Calculation Amount of Various Protocol Stack Fast Determination Methods", The Institute of Electronics, Information and Communication Engineers, March, 2018

SUMMARY OF THE INVENTION

Technical Problem

However, according to the method of copying packets at the sampling rate as in the related art and the method of performing band control (policing or shaping) described above, a smaller traffic than actual traffic is analyzed and therefore, there is a problem that communication with an attack suspected may not be detected accurately depending on setting of a threshold and the like.

Means for Solving the Problem

In order to solve the problem described above and achieve an object, the present invention provides an estimation method performed by an estimation apparatus, the estimation method including: acquiring information about a band of a flow within a tunnel and a band of each flow after policing; calculating a ratio of a traffic volume after policing to a traffic volume before policing by using the information about the band acquired in the acquisition; and estimating a traffic volume of a flow to be monitored within the tunnel by using the ratio calculated in the calculation and the band after policing.

Effects of the Invention

The present invention achieves the effect of accurately detecting the communication with an attack suspected using low sample traffic.

DESCRIPTION OF EMBODIMENTS

Embodiments of an estimation method, an estimation apparatus, and an estimation program according to the present application will be described below in detail with reference to the drawings. Note that the estimation method, the estimation apparatus, and the estimation program according to the present application are not limited to the embodiments.

First Embodiment

In following embodiments, a configuration of a communication system, a configuration of a controller, and flows of processing in the controller and the communication system according to a first embodiment will be sequentially described in this order, and finally, effects according to the first embodiment will be described.

Configuration of Communication System

Figure 1:
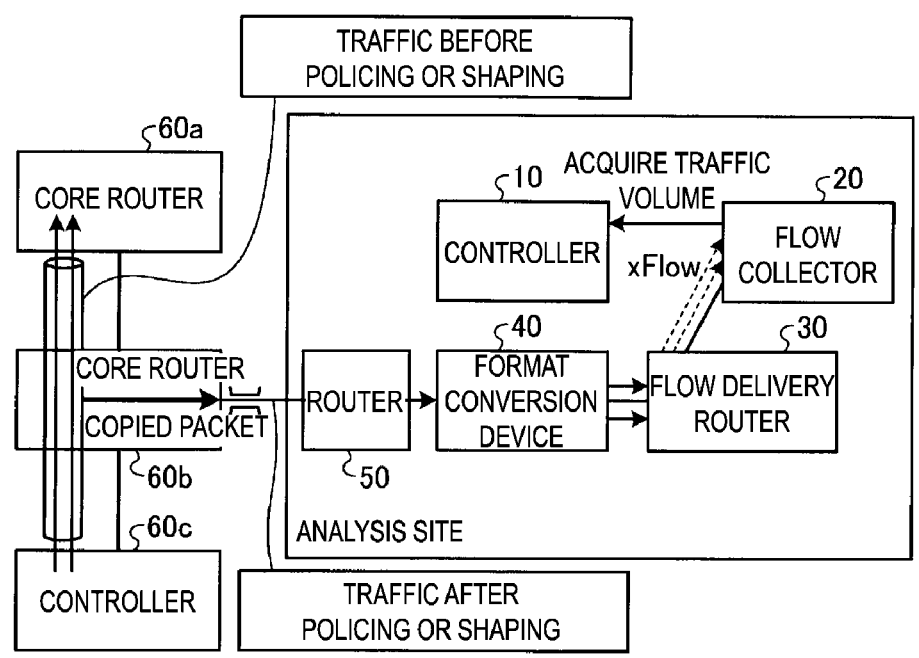
FIG. 1 is a diagram illustrating one example of a configuration of a communication system according to a first embodiment.

First, a communication system according to the first embodiment will be described with reference to FIG. 1. FIG. 1 is a diagram illustrating one example of a configuration of the communication system according to the first embodiment. The communication system according to the first embodiment has a controller 10, a flow collector 20, a flow delivery router 30, a format conversion device 40, a router 50, and a plurality of core routers 60a to 60c in an analysis site. Note that the configuration illustrated in FIG. 1 is merely an example, and the specific configuration and the number of devices are not particularly limited. In addition, when described collectively, the core routers 60a to 60c are described as the core router 60.

The controller 10 controls each device in the communication system. For example, the controller 10 performs setting of the policing or shaping of packets in each tunnel of the core router 60.

The controller 10 also acquires information about the band of a flow within the tunnel and the band after the policing or shaping of each flow. The controller 10 uses the acquired information about the band to calculate the ratio of the traffic volume after policing or shaping to the traffic volume before policing or shaping. The controller 10 estimates the traffic volume within the tunnel of the flow to be monitored using the calculated ratio and the band of each flow after policing or shaping.

The flow collector 20 collects flow information about the network from the flow delivery router 30 and the like. Note that, in the following example, mainly the flow information about the network xFlow is described as an example. The xFlow includes source IP address (SrcIP_X), destination IP address, source port number, destination port number, protocol, flag, and the like. The flow collector 20 manages the band of the tunnel and the band of each flow after policing or shaping from the flow information.

The flow delivery router 30 outputs traffic information (e.g., xFlow information) of each flow of packets output from the format conversion device 40 to the flow collector 20. The format conversion device 40 converts tunnel packets from the tunnel, which are sampled at the core router 60b, into a format that can be analyzed by a security device (not illustrated). The router 50 receives tunnel packets from the tunnel, which are sampled at the core router 60b, and notifies the format converting device 40.

A tunnel is set between the core router 60a and the core router 60c. A core router 60b is installed to intervene, in the tunnel, between the core router 60a and the core router 60c. The core router 60b applies policing or shaping to the packets of the flow within the tunnel and notifies the router 50 of the sampled packets.

Also, in the example of FIG. 1, the band of the flow within the tunnel is reffered to as traffic before policing or shaping, and the band of copied packets output from the core router 60b according to the setting of policing or shaping is reffered to as traffic after the policing or shaping.

Configuration of Controller

Figure 2:
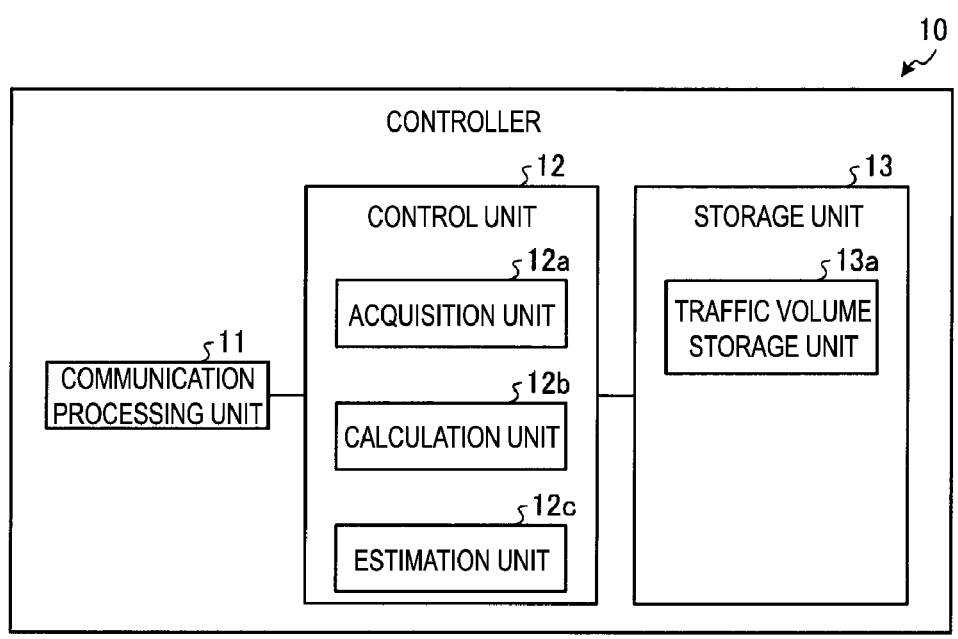
FIG. 2 is a block diagram illustrating a configuration example of a controller according to the first embodiment.

Next, a configuration of the controller 10 illustrated in FIG. 1 will be described with reference to FIG. 2. FIG. 2 is a block diagram illustrating a configuration example of the controller according to the first embodiment. As illustrated in FIG. 2, the controller 10 includes a communication processing unit 11, a control unit 12, and a storage unit 13. Processing executed by each unit of the controller 10 will be described below.

The communication processing unit 11 controls communication related to various information exchanged with an apparatus connected with the communication processing unit 11. For example, the communication processing unit 11 receives, from the flow collector 20, the traffic information about each flow.

The storage unit 13 stores data and programs that are necessary for various types of processing executed by the control unit 12, and more specifically a traffic volume storage unit 13a that is closely related to the present invention. For example, the storage unit 13 is a random access memory (RAM), a semiconductor memory element such as a flash memory, or a storage apparatus such as a hard disk and an optical disc. The traffic volume storage unit 13a stores, for example, information about the traffic volume (band) of the flow within the tunnel, which is acquired from the flow collector 20.

The control unit 12 has an internal memory for storing programs that specify various processing procedures and required data and executes various types of processing using the programs and the data. The control unit 12 includes an acquisition unit 12a, a calculation unit 12b, and an estimation unit 12c that are closely related to the present invention. Here, the control unit 12 is an electronic circuit such as a Central Processing Unit (CPU) or a Micro Processing Unit (MPU), or an integrated circuit such as an Application Specific Integrated Circuit (ASIC) or a Field Programmable Gate Array (FPGA).

The acquisition unit 12a acquires information about the band of the flow within the tunnel and the band of each flow after policing or shaping. For example, the acquisition unit 12a acquires the band of each flow after policing or shaping, the flow collector, the band of the flow within the tunnel, and the band of the flow after policing or shaping from the flow collector 20.

Figure 3:
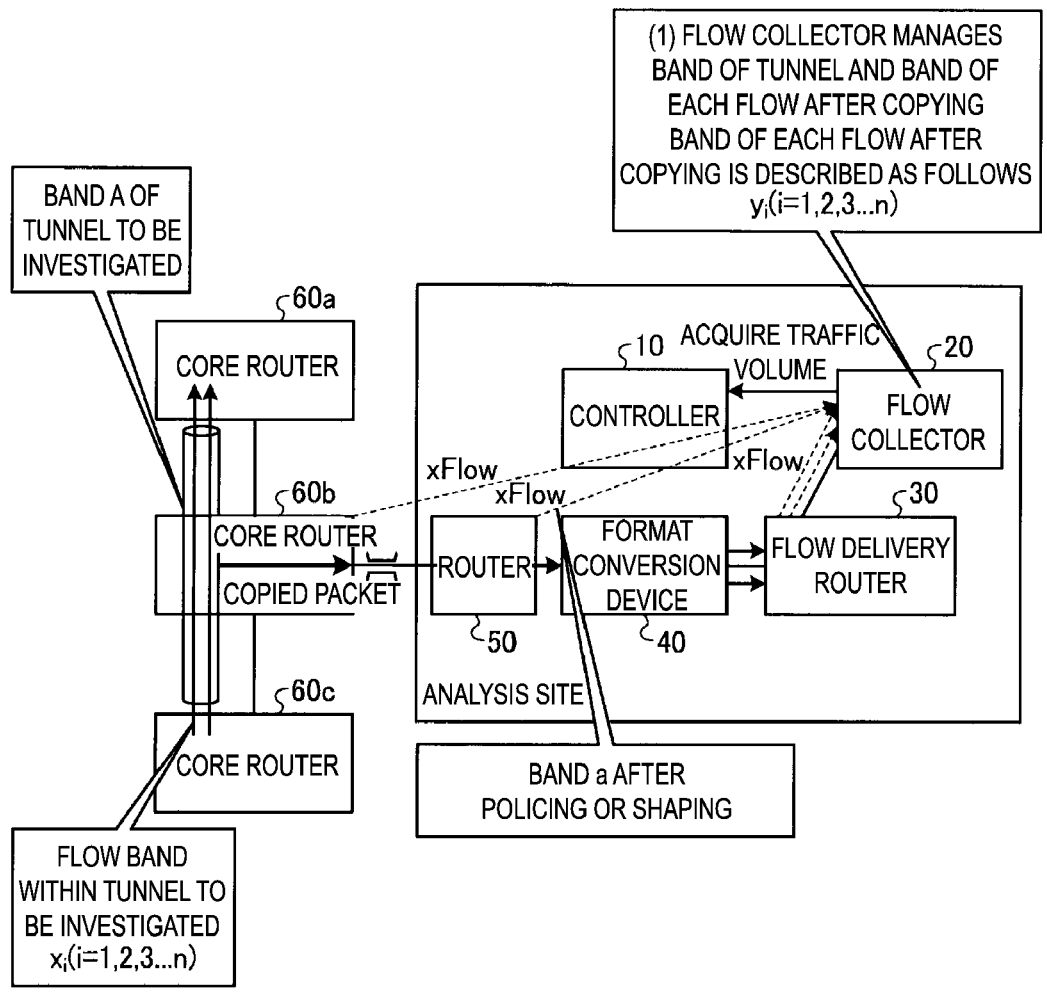
FIG. 3 is a diagram illustrating processing of managing, by a flow collector, the band of a tunnel and the band of each flow after copying according to the first embodiment.

As illustrated in FIG. 3, the flow collector 20 acquires the traffic information (e.g., xFlow information) about each flow from the flow delivery router 30 and manages the band of each flow after copying. In the example of FIG. 3, the band of each flow after policing or shaping is described as "$y_i$" and there are n flows. Also, the flow collector 20 acquires the xFlow information about the flow within the tunnel from the core router 60b and manages the band "A" of the tunnel as a sum of traffic of the flow within the tunnel. In addition, the flow collector 20 acquires the xFlow information of the copied packets after policing or shaping from the router 50 and manages the band "a" after policing or shaping as a sum of traffic after policing or shaping. The acquisition unit 12a acquires the band "$y_i$" of each flow after copying, the band "A" of the tunnel, and the band "a" after policing or shaping.

The calculation unit 12b uses the information about the band acquired by the acquisition unit 12a to calculate the ratio of the traffic volume after policing or shaping to the traffic volume before the policing or shaping. For example, the calculation unit 12b uses the band of the flow within the tunnel and the band of flow after policing or shaping, which are acquired by the acquisition unit 12a, to calculate the ratio.

Figure 4:
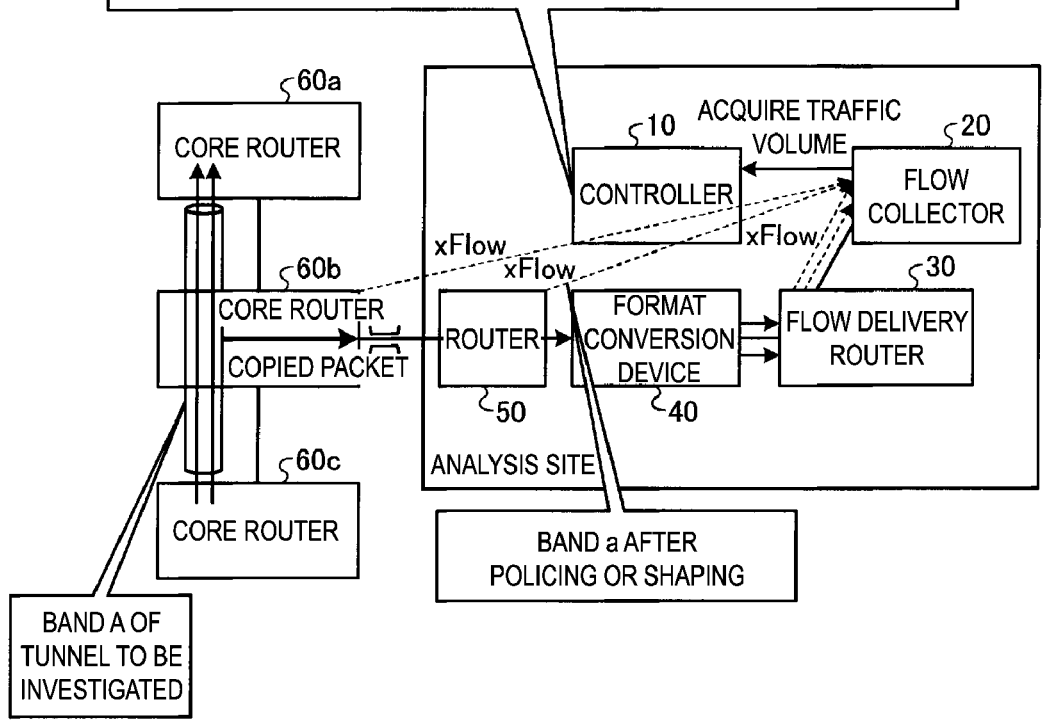
FIG. 4 is a diagram illustrating processing of estimating traffic volume of a flow to be monitored by the controller according to the first embodiment.

The estimation unit 12c uses the ratio calculated by the calculation unit 12b and the band of each flow after policing or shaping of each flow to estimate the traffic volume within the tunnel of the flow to be monitored. For example, as illustrated in FIG. 4, the calculation unit 12b calculates the amount of packet loss due to policing or shaping based on the band of the tunnel and the band of each flow after copying. In the example of FIG. 4, the ratio of packet loss is calculated by dividing the band "A" of the tunnel by the band "a" after policing or shaping.

Then, the estimation unit 12c estimates the band "$x_i$" of copy source traffic of the flow to be monitored by multiplying the band "$y_i$" of the any flow 1 to n to be monitored by the ratio calculated by the calculation unit 12b.

Flow of Processing of Controller

Figure 5:
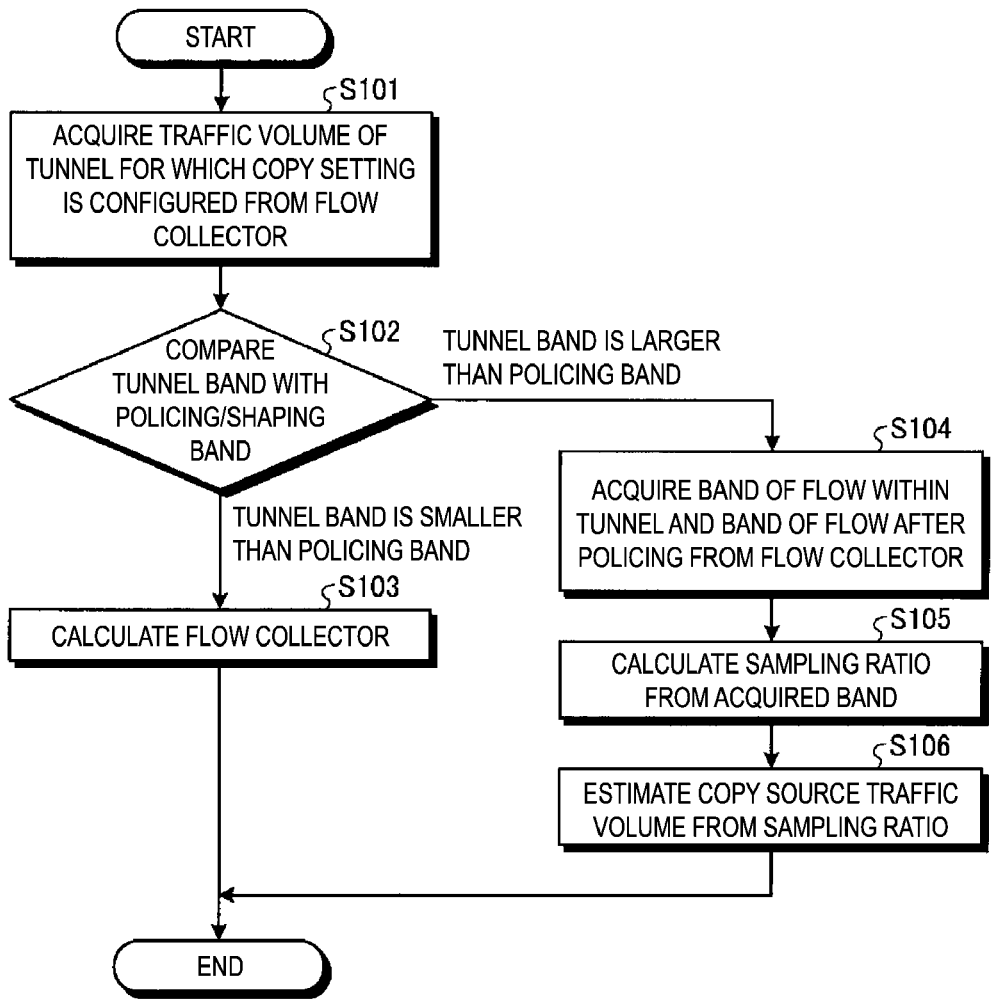
FIG. 5 is a flowchart illustrating processing executed by the controller according to the first embodiment.

Next, a flow of processing executed by the controller 10 according to the first embodiment will be described with reference to FIG. 5. FIG. 5 is a flowchart illustrating the processing executed by the controller according to the first embodiment.

As illustrated in FIG. 5, the controller 10 acquires, from the flow collector, the traffic volume of the tunnel for which copy setting is configured (Step S101). The controller 10 compares the tunnel band with the policing or shaping band (described as the policing/shaping band in FIG. 5) (Step S102). As a result, when the tunnel band is smaller than the policing or shaping band, the controller 10 uses the information received from the flow collector 20 as it is to calculate the traffic volume (Step S103). Also, when the tunnel band is larger than the policing or shaping band, the controller 10 acquires, from the flow collector 20, an area of the flow within the tunnel and an area of the flow after policing or shaping (Step S104).

Then, the controller 10 calculates the sampling ratio from the acquired band (Step S105) and estimates the traffic of the copy source from the sampling ratio (Step S106).

Flow of Processing by Communication System

Figure 6:
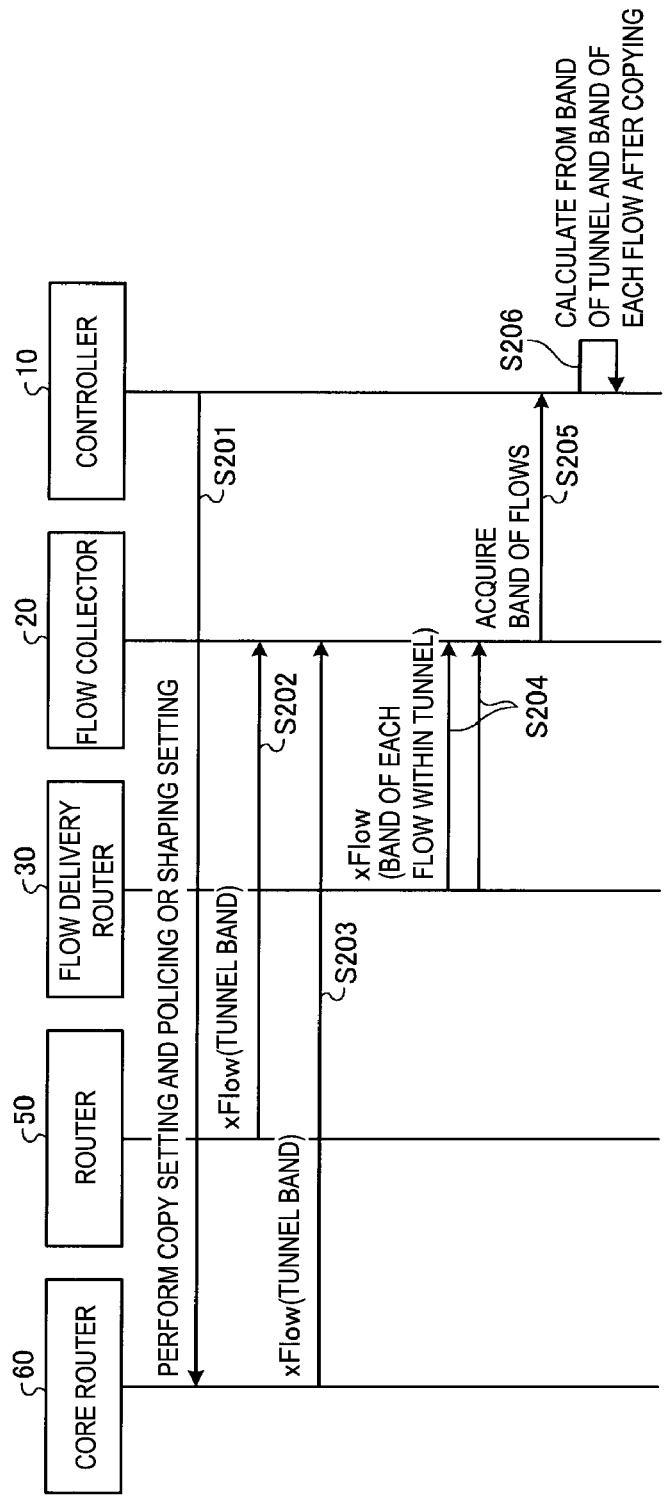
FIG. 6 is a sequence diagram illustrating processing executed by the communication system according to the first embodiment.

Next, a flow of processing executed by the communication system according to the first embodiment will be described with reference to FIG. 6. FIG. 6 is a sequence diagram illustrating the processing executed by the communication system according to the first embodiment.

As illustrated in FIG. 6, the controller 10 performs setting of copying and setting of policing or shaping for the core router 60 (Step S201). Then, the flow collector 20 acquires from the router 50 the xFlow information of the copied packet after policing or shaping (Step S202). The flow collector 20 acquires, from the core router 60b, the xFlow information about the flow within the tunnel (Step S203).

The flow collector 20 also acquires traffic information (e.g., xFlow information) about each flow from the flow delivery router 30 (Step S204). Then, the controller 10 acquires the bands of the flows from the flow collector 20 (Step S205). That is, the controller 10 acquires the band "$y_i$" of each flow after copying, the band "A" of the tunnel, and the band "a" after policing or shaping.

Then, the controller 10 calculates the ratio of packet loss based on the band of the tunnel and the band of each flow after copying (Step S206). Using the above example, the controller 10 calculates the ratio of packet loss by dividing the band "A" of the tunnel by the band "a" after policing or shaping, for example. Thereafter, the controller 10 estimates the band "$x_i$" of the copy source traffic of the flow to be monitored by multiplying the band "$y_i$" of the flow to be monitored by the ratio calculated by the calculation unit 12b.

Effects of First Embodiment

In this manner, the controller 10 of the communication system according to the first embodiment acquires information about the band of the flow within the tunnel and the band of each flow after policing or shaping. The controller 10 uses the acquired information about the band to calculate the ratio of the traffic volume after policing or shaping to the traffic volume before policing or shaping. The controller 10 estimates the traffic volume within the tunnel of the flow to be monitored using the calculated ratio and the band of each flow after policing or shaping. Thus, in the communication system according to the first embodiment, the controller 10 can accurately detect communication with an attack suspected using small sample traffic.

Figure 7:
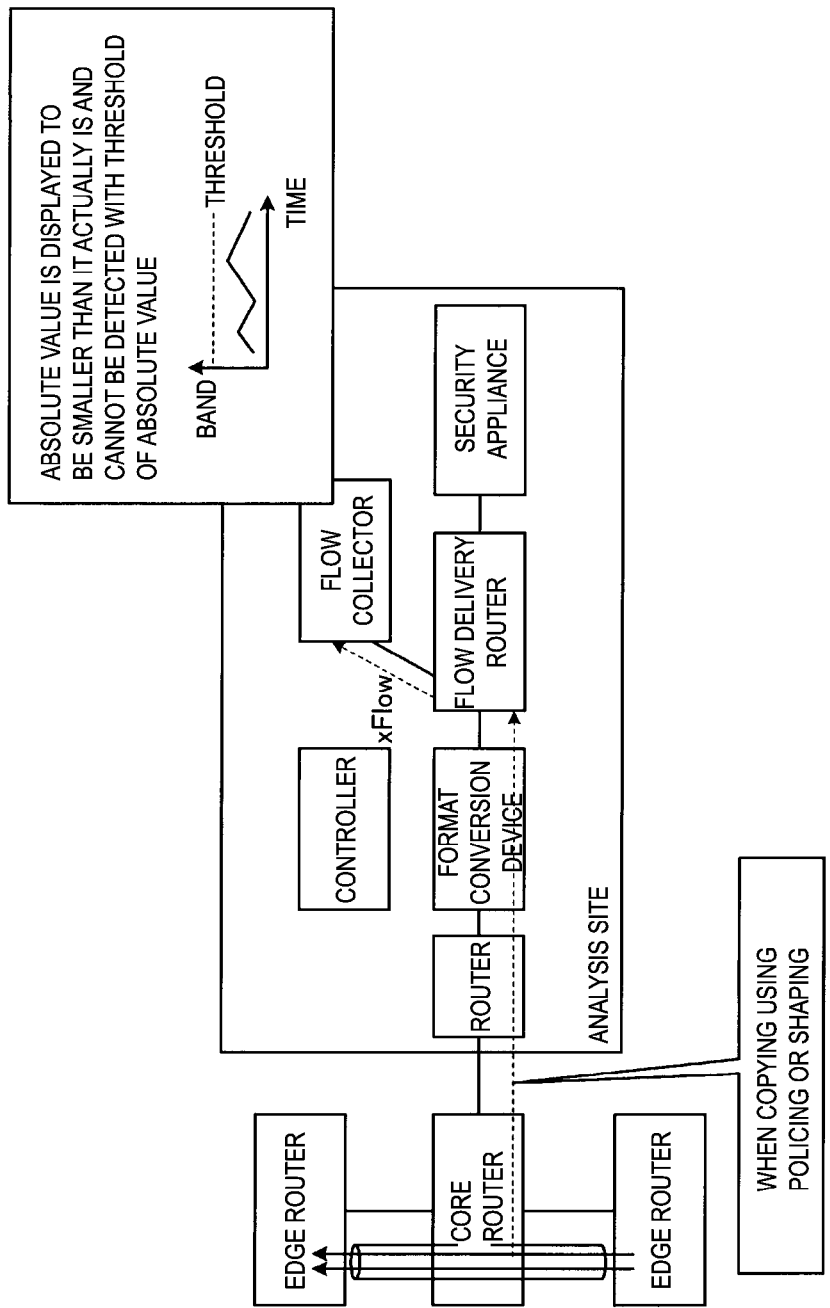
FIG. 7 is a diagram for describing effects of the communication system according to the first embodiment.
Figure 8:
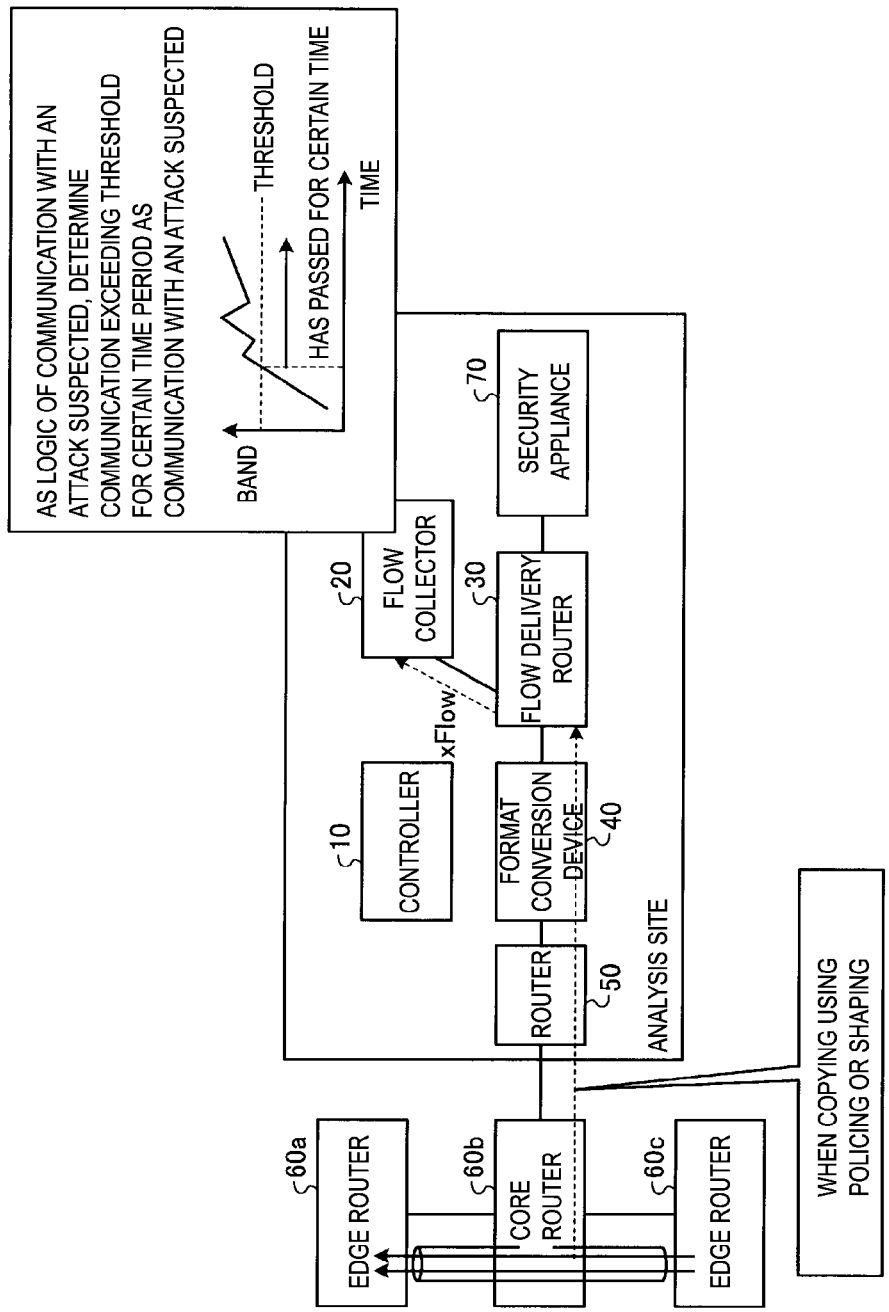
FIG. 8 is a diagram for describing effects of the communication system according to the first embodiment.

FIGS. 7 and 8 are diagrams for describing effects of the communication system according to the first embodiment. In the example of FIG. 7, a case is described where communication with an attack suspected within the tunnel is detected with the traffic volume resulting from policing or shaping. That is, in the related art, when it is desired to detect communication, exceeding a certain threshold, with an attack suspected within the tunnel, and there is not enough band available on the line to the analysis site, limited amount of copied packets are transmitted. As a result, an absolute value indicated is smaller than it actually is and the suspected communication cannot be detected with the absolute value.

In contrast, in the communication system according to the first embodiment, as illustrated in FIG. 8, to detect the flow with an attack suspected within the tunnel, the value measured by the flow collector is corrected to estimate the traffic volume before copying. Thus, as a logic for detection of communication with an attack suspected, communication with the traffic volume before copying exceeding a threshold for a certain time period can be determined as the communication with an attack suspected.

Second Embodiment

In the first embodiment described above, the case has been described in which ratio of packet loss is calculated using the band of the flow within the tunnel and the band of flow after policing or shaping, but the invention is not limited to this. For example, the ratio of packet loss may be calculated using the band of the flow within the tunnel and the preset band of policing or shaping.

Thus, in the following description, a controller 10A according to the second embodiment calculates the ratio of packet loss using the band of the flow within the tunnel and the preset policing or shaping band. Note that description of the same configuration and processing as those of the communication system according to the first embodiment will be omitted.

Figure 9:
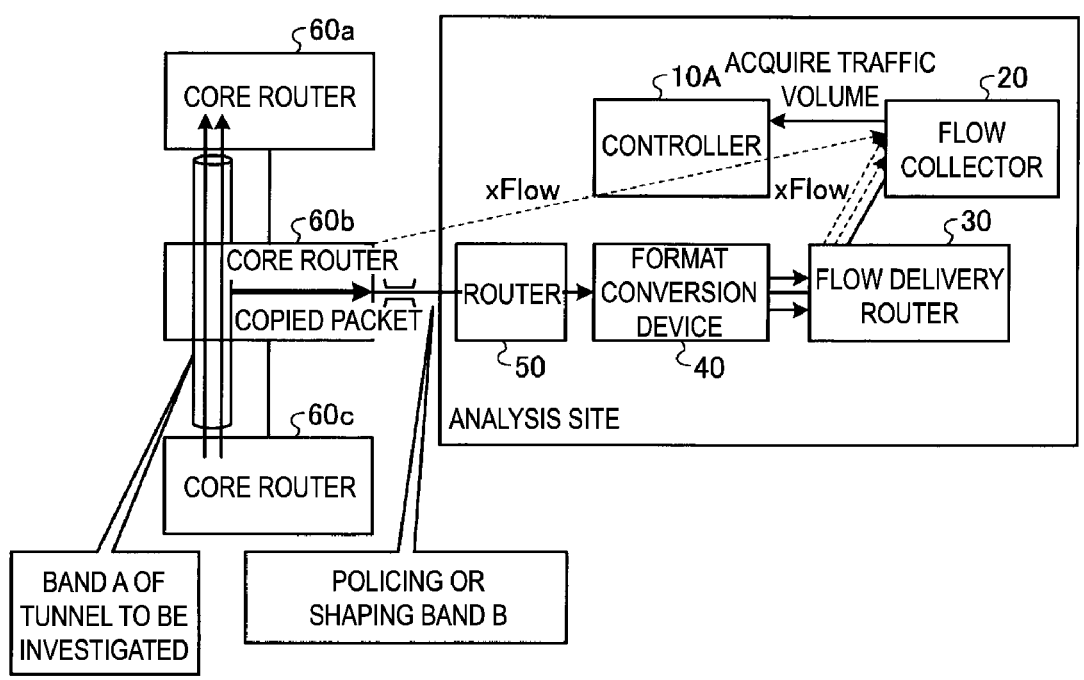
FIG. 9 is a diagram illustrating processing of managing, by a flow collector, the band of the tunnel and the band of each flow after copying according to a second embodiment.

The acquisition unit 12a of the controller 10A acquires, from the flow collector 20, the band of each flow after policing or shaping and the band of the flow within the tunnel. Processing of managing the band of the tunnel and the band of each flow after copying by the flow collector according to the second embodiment is described with reference to FIG. 9. FIG. 9 is a diagram illustrating processing of managing the band of the tunnel and the band of each flow after copying by the flow collector according to the second embodiment.

As illustrated in FIG. 9, the flow collector 20 acquires the traffic information (e.g., xFlow information) about each flow from the flow delivery router 30 and manages the band of each flow after copying. Also, the flow collector 20 acquires the xFlow information about the flow within the tunnel from the core router 60b and manages the band "A" of the tunnel as a sum of traffic of the flow within the tunnel. The acquisition unit 12a acquires the band "$y_i$" of each flow after copying and the band "A" of the tunnel. It is assumed that the controller 10A knows a preset policing or shaping band "B".

The calculation unit 12b of the controller 10A uses the band of the flow within the tunnel and the preset policing or shaping band, which are acquired by the acquisition unit 12a, to calculate the ratio of the traffic volume after policing or shaping to the traffic volume before policing or shaping.

Figure 10:
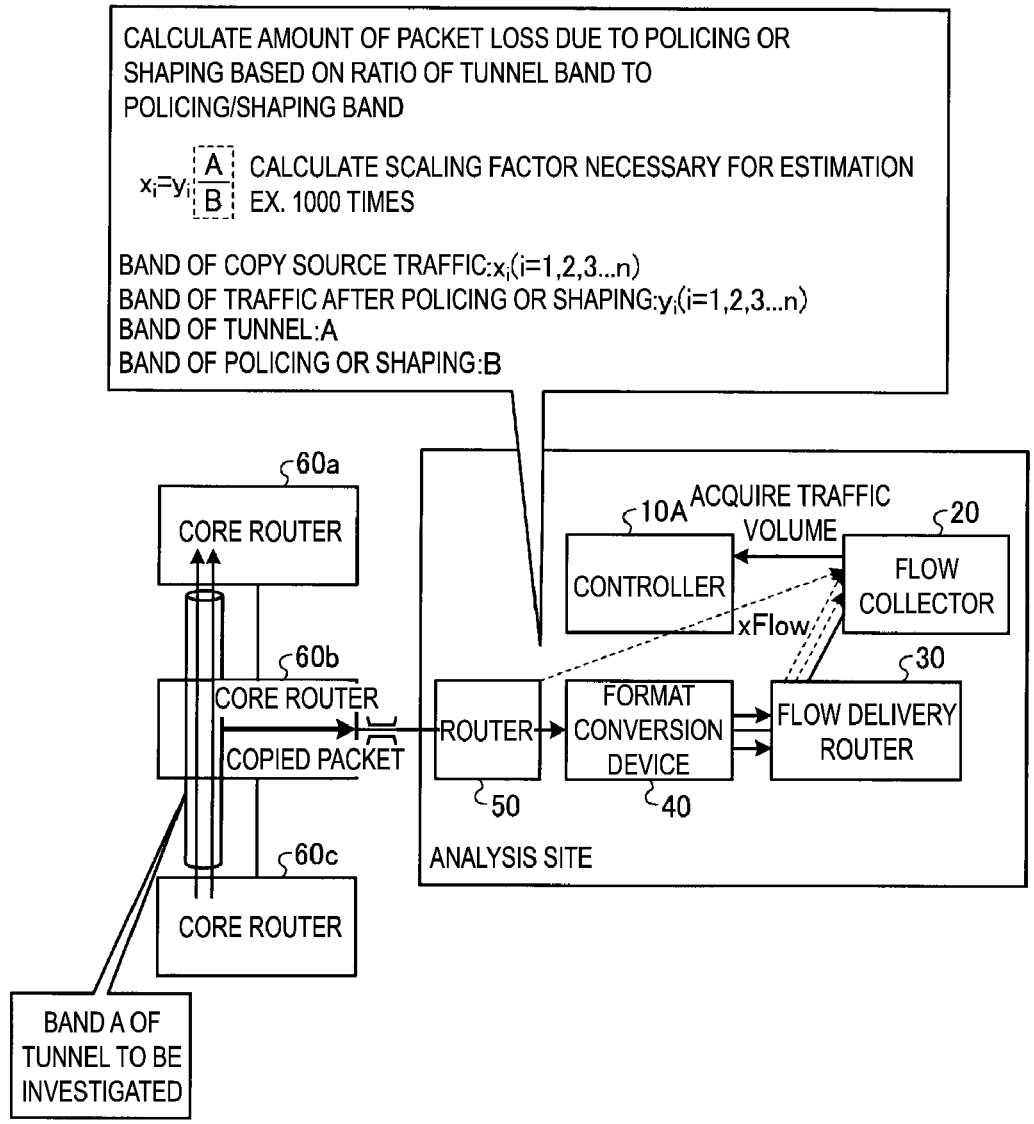
FIG. 10 is a diagram illustrating processing of estimating, by a controller, traffic volume of the flow to be monitored according to the second embodiment.

The estimation unit 12c uses the ratio calculated by the calculation unit 12b and the band of each flow after policing or shaping of each flow to estimate the traffic volume within the tunnel of the flow to be monitored. For example, as illustrated in FIG. 10, the calculation unit 12b calculates the amount of packet loss due to policing or shaping based on the band of the tunnel and the band of each flow after copying. In the example of FIG. 4, the ratio of packet loss is calculated by dividing the band "A" of the tunnel by the policing or shaping band "B".

Then, the estimation unit 12c estimates the band "$x_i$" of the copy source traffic of the flow to be monitored by multiplying the band "$y_i$" of the flow to be monitored of any of 1 to n by the ratio calculated by the calculation unit 12b.

Figure 11:
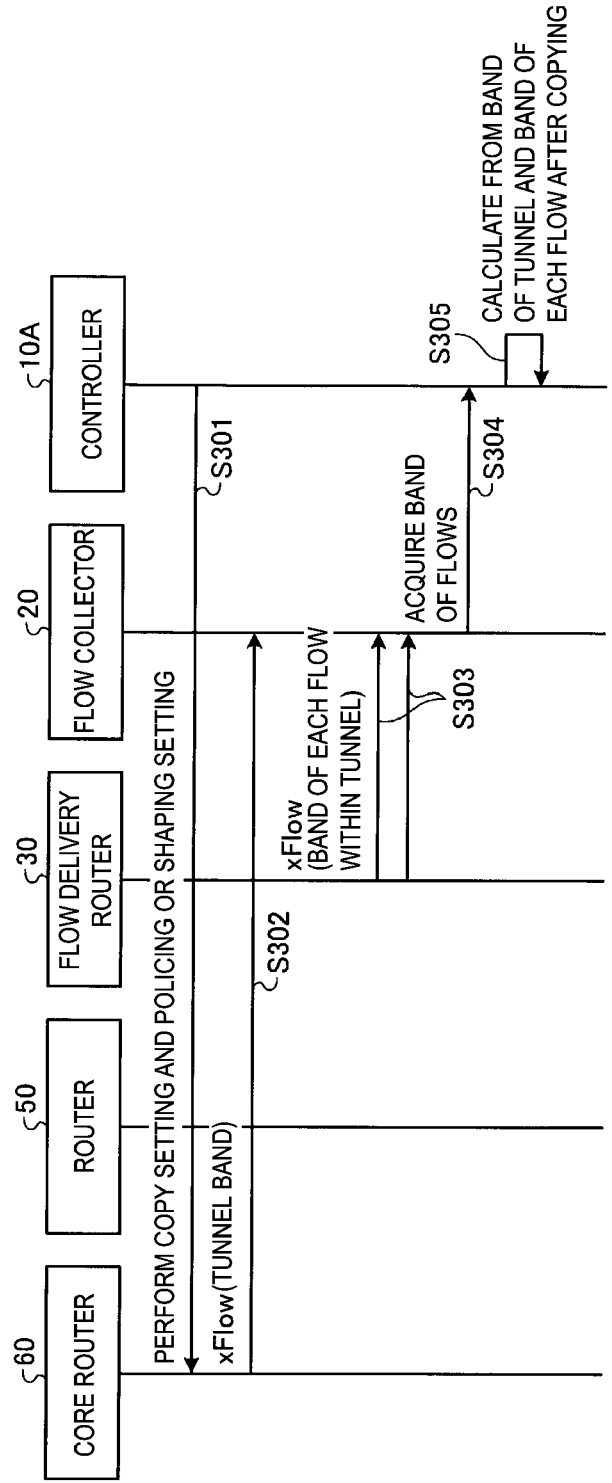
FIG. 11 is a sequence diagram illustrating processing executed by a communication system according to the second embodiment.
Figure 12:
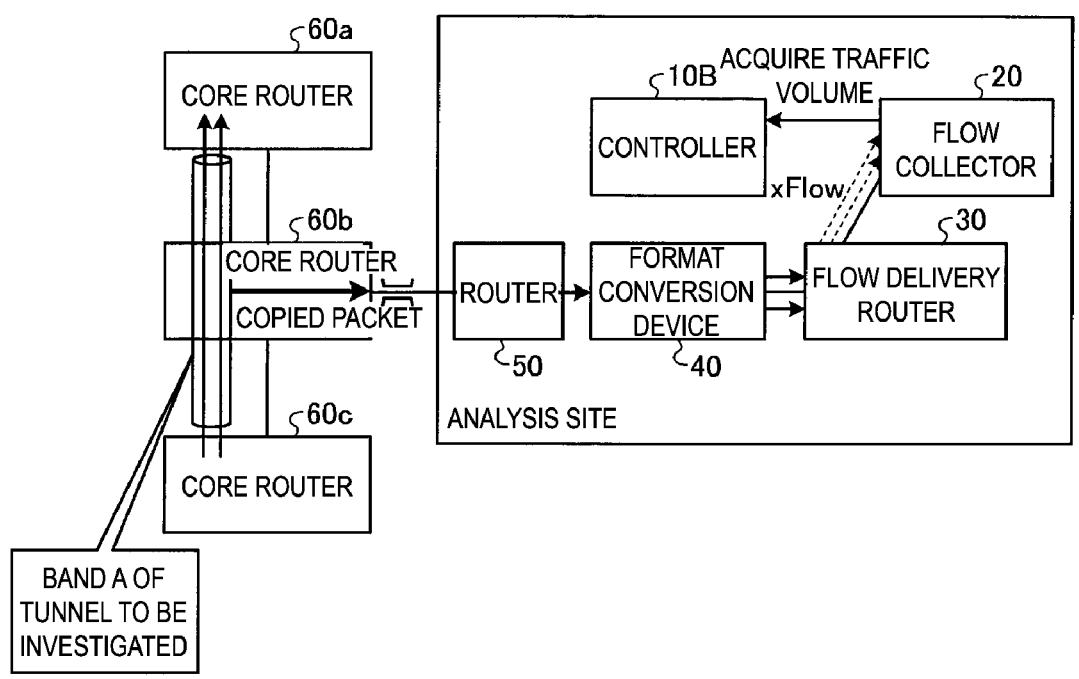
FIG. 12 is a diagram illustrating processing of managing, by a flow collector, the band of each flow after copying according to a third embodiment.

Next, a flow of processing of the communication system according to the second embodiment will be described with reference to FIG. 11. FIG. 11 is a sequence diagram illustrating the processing of the communication system according to the second embodiment. As illustrated in FIG. 11, the controller 10A performs setting of copying and setting of policing or shaping for the core router 60 (Step S301). Then, the flow collector 20 acquires, from the core router 60b, the xFlow information about the flow within the tunnel (Step S302).

The flow collector 20 also acquires traffic information (e.g., xFlow information) about each flow from the flow delivery router 30 (Step S303). Then, the controller 10A acquires the bands of the flows from the flow collector 20 (Step S304). That is, the controller 10A acquires the band "$y_i$" of each flow after copying and the band "A" of the tunnel.

Then, the controller 10A calculates the ratio of packet loss based on the band of the tunnel and the band of each flow after copying (Step S305). Using the example described above, the controller 10A calculates the ratio of packet loss by dividing the band "A" of the tunnel by the policing band "B", for example. Thereafter, the controller 10A estimates the band "$x_i$" of the copy source traffic of the flow to be monitored by multiplying the band "$y_i$" of the flow to be monitored by the ratio calculated by the calculation unit 12b.

Third Embodiment

In the second embodiment described above, the case has been described in which the controller 10A acquires, from the core router 60b, the xFlow information about the flow within the tunnel to acquire the traffic before the policing, but the present invention is not limited thereto. For example, a packet counter may be acquired from a core router that counts the number of packets in the flow within the tunnel, and the packet counter may be used to calculate the band of the flow within the tunnel.

Thus, in the following description, a controller 10B according to a third embodiment acquires a packet counter from a core router that counts the number of packets in the flow within the tunnel, and uses the packet counter to calculate the band of the flow within the tunnel. Note that description of the same configuration and processing as those of the communication system according to the first embodiment will be omitted.

The acquisition unit 12a of the controller 10B acquires, from the flow collector 20, the packet counter from the core router 60b that counts the number of packets of the flow within the tunnel. The calculation unit 12b of the controller 10B uses the packet counter to calculate the band of the flow within the tunnel, and uses the band of the flow within the tunnel and the preset policing band to calculate the ratio of the traffic volume after policing to the traffic volume before policing.

Figure 13:
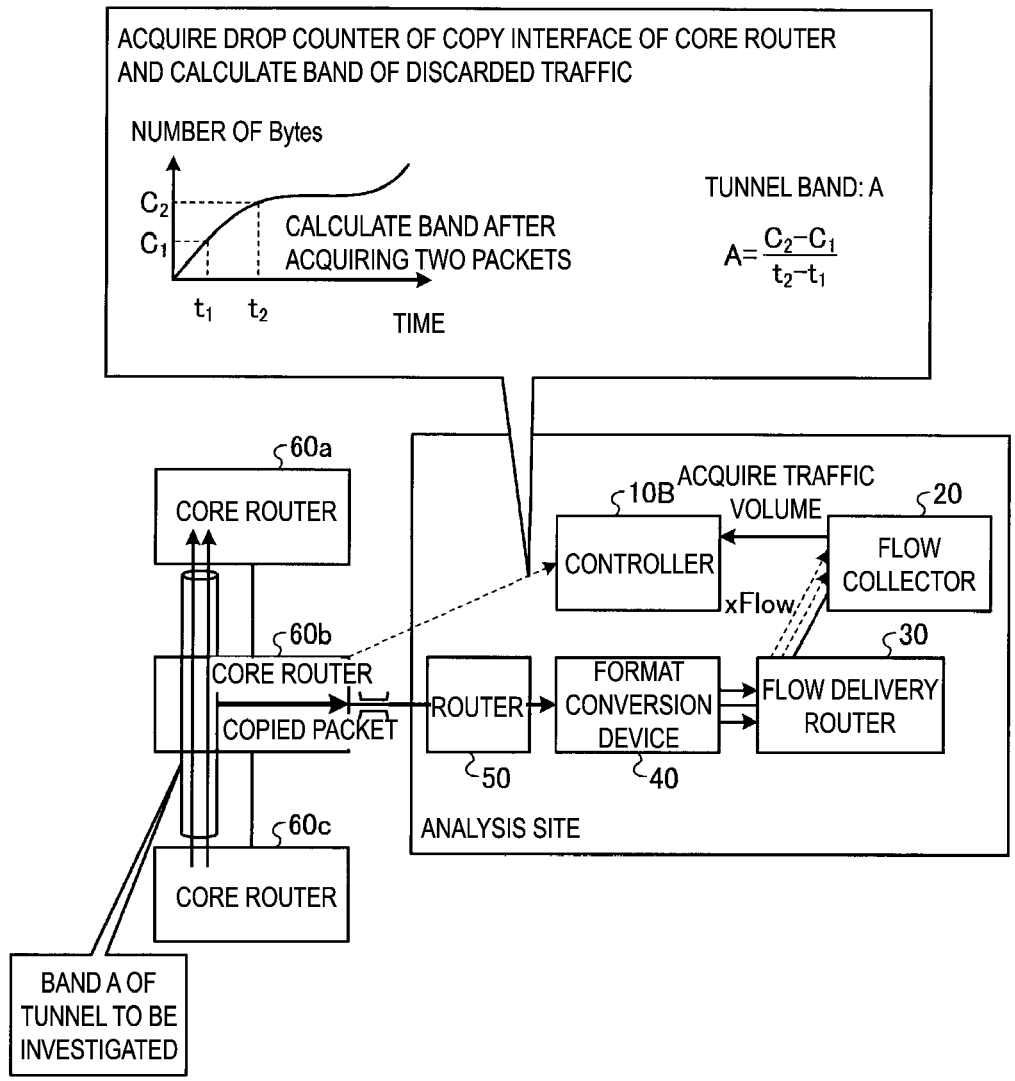
FIG. 13 is a diagram illustrating processing of acquiring a DROP counter and calculating the band of the tunnel by a controller according to the third embodiment.

Processing of acquiring a DROP counter and calculating the band of the tunnel by the controller 10B according to the third embodiment will be described below with reference to FIG. 13. FIG. 13 is a diagram illustrating the processing of acquiring the DROP counter and calculating the band of the tunnel by the controller according to the third embodiment. As illustrated in FIG. 13, the controller 10B acquires the DROP counter of the copy interface of the core router 60b and calculates the band of the tunnel. Specifically, the controller 10B acquires the number of packets (number of bytes) $C_1$ at a time $t_1$ and the number of packets $C_2$ at a time $t_2$, and calculates the "$C_2-C_1/t_2-t_1$" to calculate the tunnel band A.

Figure 14:
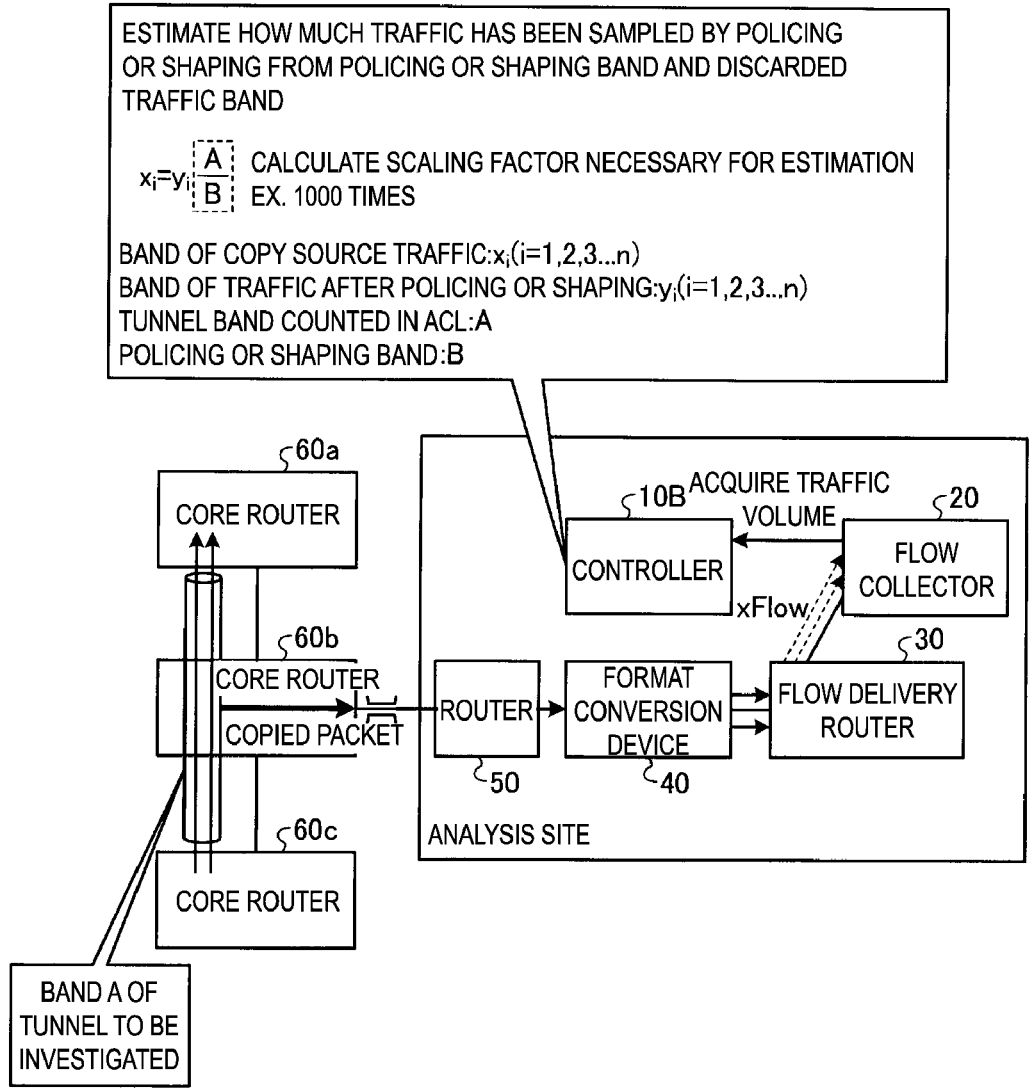
FIG. 14 is a diagram illustrating processing of estimating, by the controller, traffic volume of the flow to be monitored according to the third embodiment.

The estimation unit 12c estimates the traffic volume within the tunnel of the flow to be monitored by using the ratio calculated by the calculation unit 12b and the band of each flow after policing. For example, as illustrated in FIG. 14, the calculation unit 12b calculates the amount of packet loss due to policing based on the tunnel band "A" and the policing band "B" that are calculated by acquiring the DROP counter. In the example of FIG. 14, the ratio of packet loss is calculated by dividing the tunnel band "A" calculated by acquiring the DROP counter by the preset policing band "B".

Then, the estimation unit 12c estimates the band "$x_i$" of the copy source traffic of the flow to be monitored by multiplying the band "$y_i$" of the flow to be monitored of any of 1 to n by the ratio calculated by the calculation unit 12b.

Figure 15:
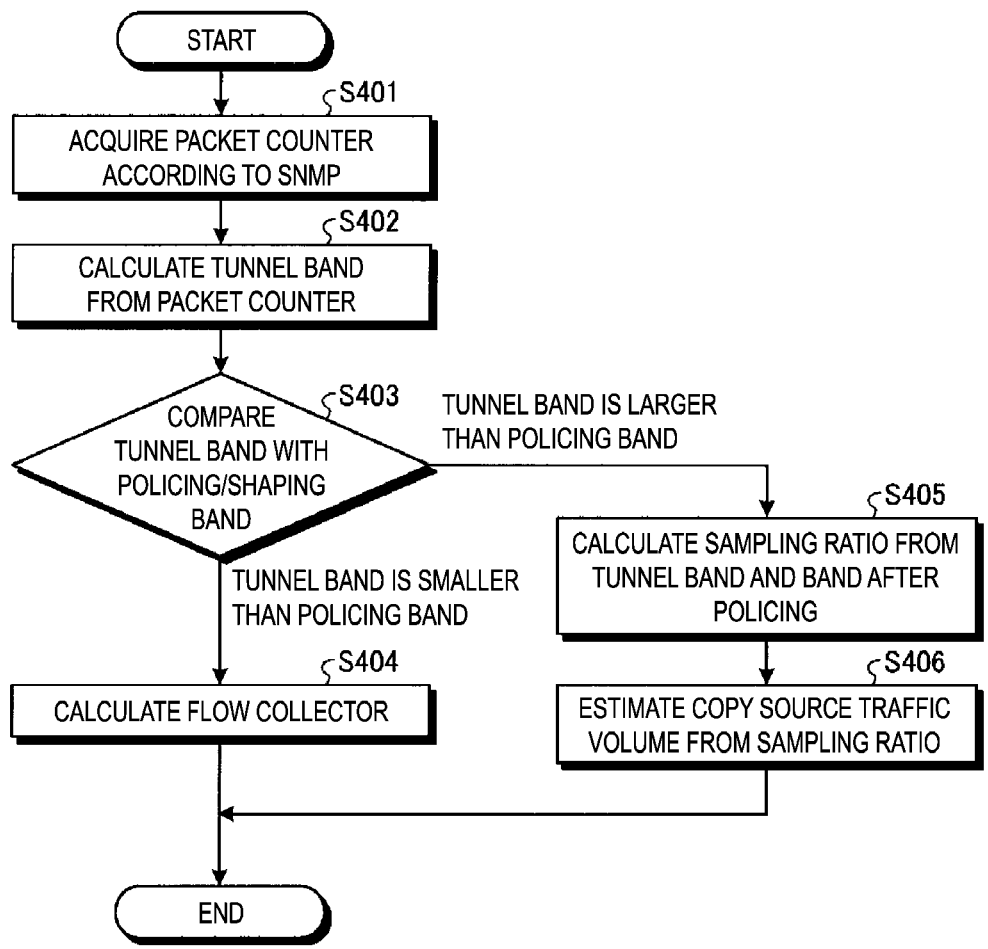
FIG. 15 is a flowchart illustrating processing executed by the controller according to the third embodiment.

Next, a flow of the processing executed by the controller 10B according to the third embodiment will be described with reference to FIG. 15. FIG. 15 is a flowchart illustrating the processing executed by the controller according to the third embodiment.

As illustrated in FIG. 15, the controller 10B acquires the packet count according to a simple network management protocol (SNMP) (Step S401). The controller 10B calculates a tunnel band from the packet counter (Step S402). Then, the controller 10B compares the tunnel band with the policing band (described as the policing/shaping band in FIG. 15) (Step S403).

As a result, when the tunnel band is smaller than the policing band, the controller 10B uses the information received from the flow collector 20 as it is to calculate the traffic volume (Step S404). When the tunnel band is larger than the policing band, the controller 10B calculates the sampling ratio based on the tunnel band and the band after policing (Step S405) and estimates the copy source traffic from the sampling ratio (Step S406).

Figure 16:
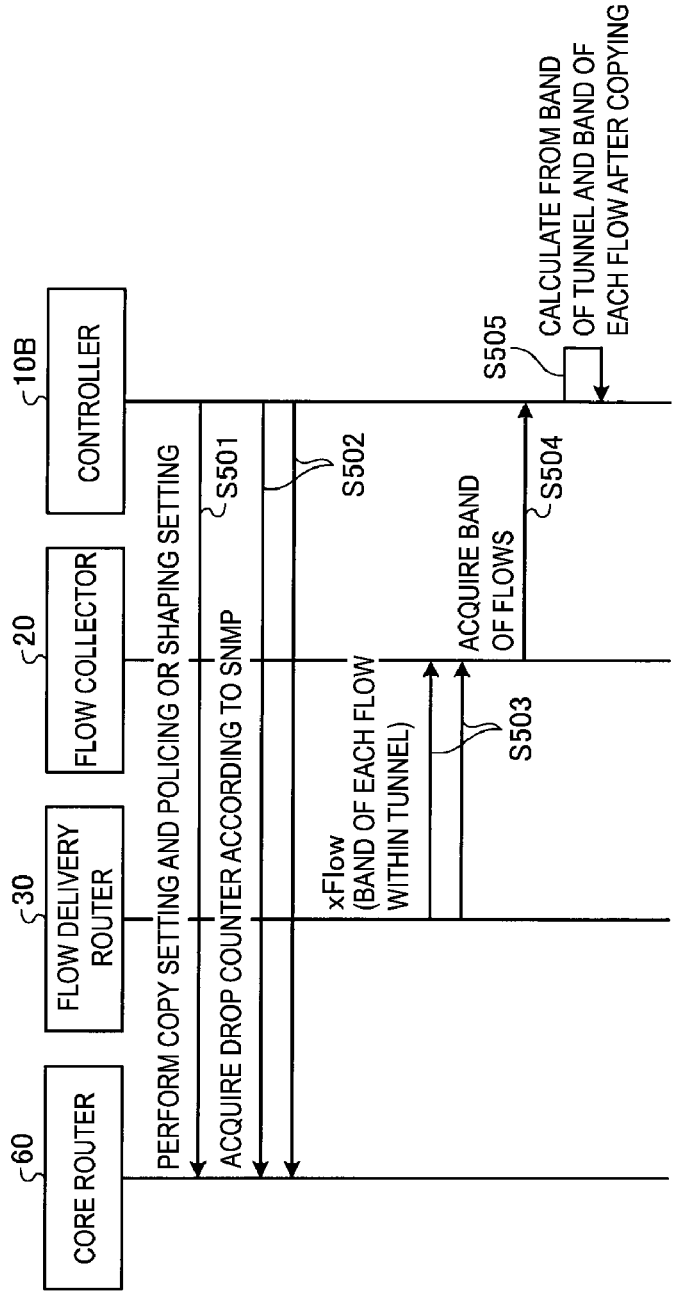
FIG. 16 is a sequence diagram illustrating processing executed by a communication system according to the third embodiment.

Next, a flow of processing of the communication system according to the third embodiment will be described with reference to FIG. 16. FIG. 16 is a sequence diagram illustrating processing executed by the communication system according to the third embodiment. As illustrated in FIG. 16, the controller 10B performs setting of copying and setting of policing or shaping for the core router 60 (Step S501). Then, the controller 10B acquires the DROP counter according to the SNMP from the core router 60 (Step S502). Then, the controller 10B uses the acquired DROP counter to calculate the tunnel band.

The flow collector 20 also acquires traffic information (e.g., xFlow information) about each flow from the flow delivery router 30 (Step S503). Then, the controller 10B acquires the bands of the flows from the flow collector 20 (Step S504). That is, the controller 10B acquires the band "$y_i$" of each flow after copying.

Then, the controller 10B calculates the ratio of packet loss based on the band of the tunnel and the band of each flow after copying (Step S505). Using the example described above, the controller 10B calculates the ratio of packet loss by dividing the band "A" of the tunnel by the policing band "B", for example. Thereafter, the controller 10B estimates the band "$x_i$" of the copy source traffic of the flow to be monitored by multiplying the band "$y_i$" of the flow to be monitored by the ratio calculated by the calculation unit 12b.

Fourth Embodiment

In the third embodiment described above, the case has been described in which the controller 10B calculates the ratio of packet loss using the preset policing band "B", but the present invention is not limited to this. For example, the controller may acquire the band after policing from the flow collector 20 that acquires the xFlow information about the copied packet after policing from the router.

Thus, in following description, a controller 10C according to a fourth embodiment acquires a packet counter from a core router that counts the number of packets in the flow within the tunnel, uses the packet counter to calculate the band of the flow within the tunnel, and acquires the band after policing from the flow collector 20. Note that description of the same configuration and processing as those of the communication system according to the first embodiment will be omitted.

The acquisition unit 12a of the controller 10C acquires the packet counter and the band of flow after policing from the core router 60a that counts the number of packets in the flow within the tunnel. The calculation unit 12b uses the packet counter to calculate the band of the flow within the tunnel, and uses the band of the flow within the tunnel and the preset policing band to calculate the ratio of the traffic volume after policing to the traffic volume before policing.

Figure 17:
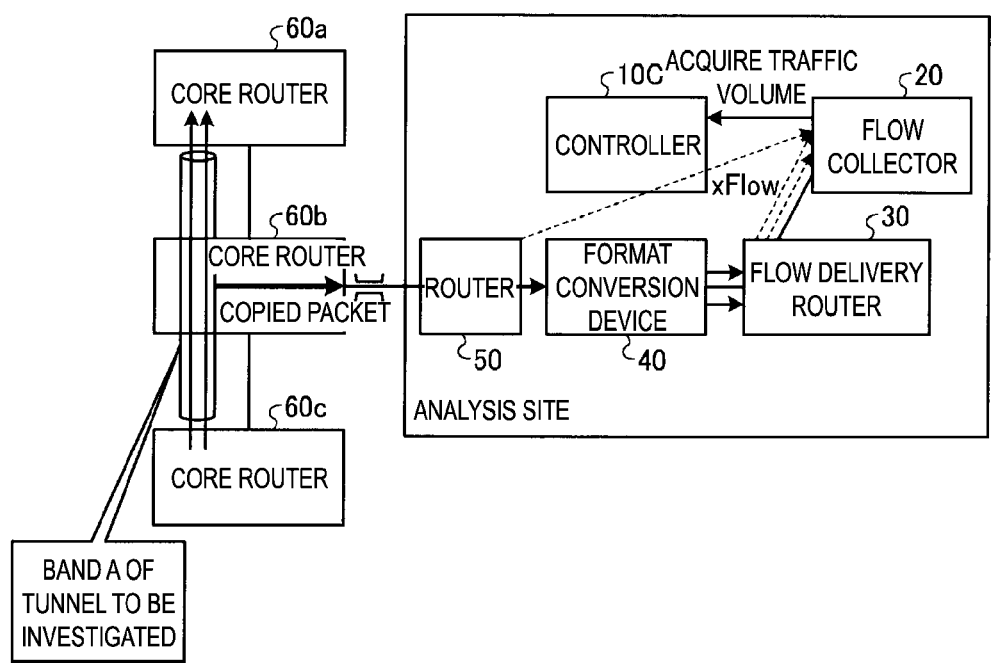
FIG. 17 is a diagram illustrating processing of managing, by the flow collector, the band of each flow after copying according to the fourth embodiment.

As illustrated in FIG. 17, the flow collector 20 acquires the traffic information (e.g., xFlow information) about each flow from the flow delivery router 30 and manages the band of each flow after copying. The flow collector 20 also acquires, from the router 50, the xFlow information about the copied packet after policing and manages the band "a" after policing as a sum of traffic after policing. The acquisition unit 12a of the controller 10C acquires the band "$y_i$" of each flow after copying and the band "a" after policing.

Figure 18:
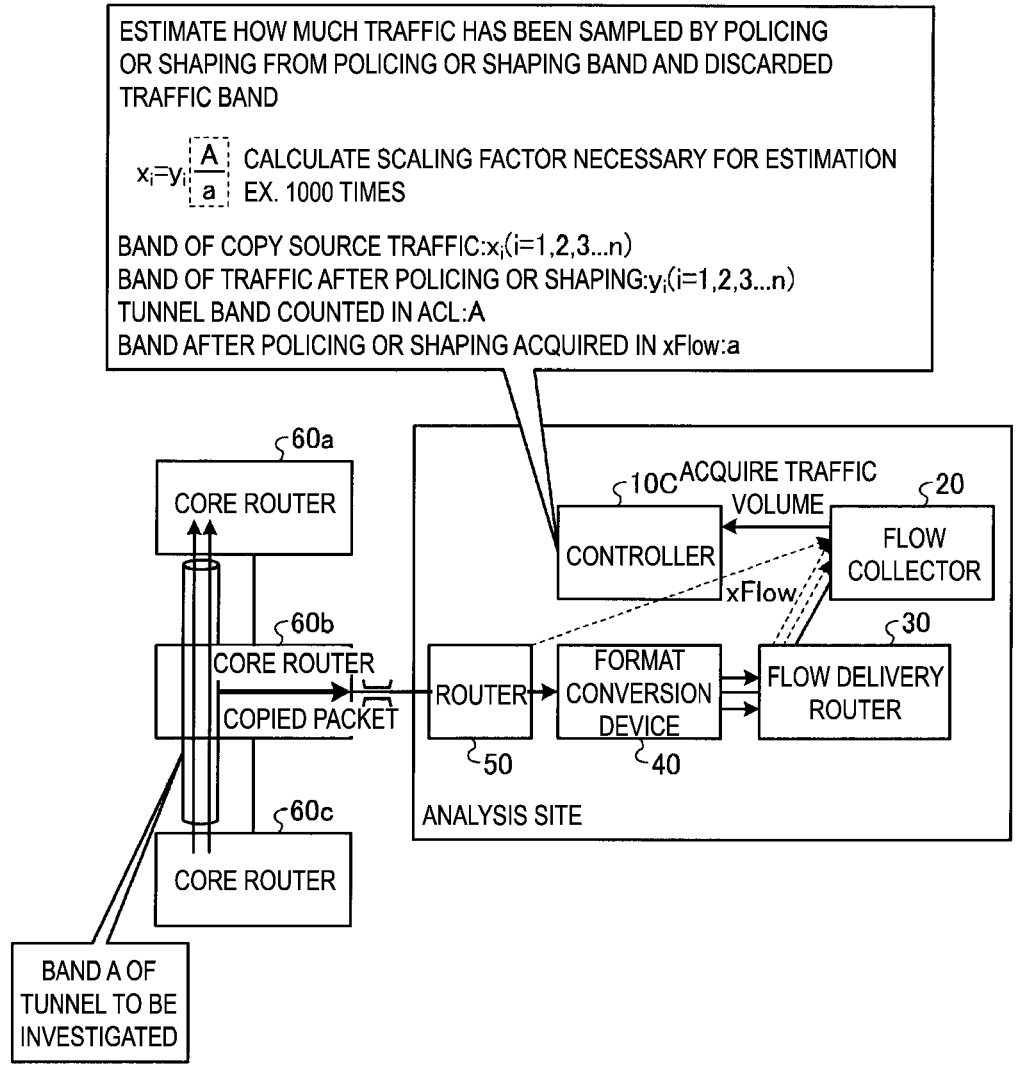
FIG. 18 is a diagram illustrating processing of estimating, by a controller, traffic volume of a flow to be monitored according to the fourth embodiment.

The estimation unit 12c estimates the traffic volume within the tunnel of the flow to be monitored by using the ratio calculated by the calculation unit 12b and the band of each flow after policing. For example, as illustrated in FIG. 18, the calculation unit 12b calculates the amount of packet loss due to policing from the tunnel band "A" calculated by acquiring the DROP counter and the band "a" after policing acquired in xFLOW. In the example of FIG. 18, the ratio of packet loss is calculated by dividing the tunnel band "A" calculated by acquiring the DROP counter by the band "a" after policing.

Then, the estimation unit 12c estimates the band "$x_i$" of the copy source traffic of the flow to be monitored by multiplying the band "$y_i$" of the flow to be monitored of any of, 1 to n by the ratio calculated by the calculation unit 12b.

Figure 19:
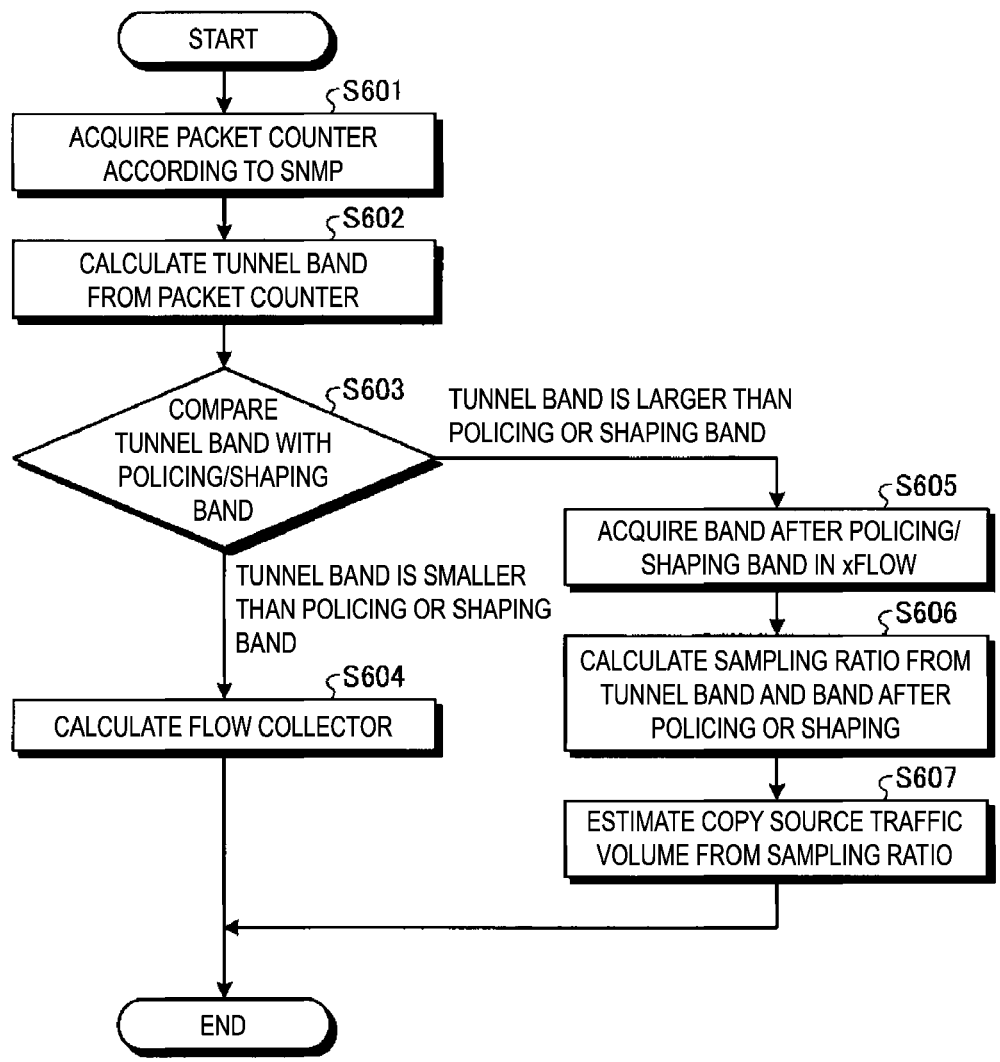
FIG. 19 is a flowchart illustrating processing executed by the controller according to the fourth embodiment.

Next, a flow of processing executed by a controller 10B according to the fourth embodiment will be described with reference to FIG. 19. FIG. 19 is a flowchart illustrating the processing executed by the controller according to the fourth embodiment.

As illustrated in FIG. 19, the controller 10C acquires the packet count according to the SNMP (Step S601). The controller 10C calculates the tunnel band from the packet counter (Step S602). Then, the controller 10C compares the tunnel band with the policing band (described as the policing/shaping band in FIG. 19) (Step S603).

As a result, when the tunnel band is smaller than the policing band, the controller 10C uses the information received from the flow collector 20 as it is to calculate the traffic volume (Step S604). Also, if the tunnel band is larger than the policing band, the controller 10C acquires the band after policing in xFlow (Step S605), the controller calculates the sampling ratio from the tunnel band and the band after policing (Step S606) and estimates copy source traffic from the sampling ratio (Step S607).

Figure 20:
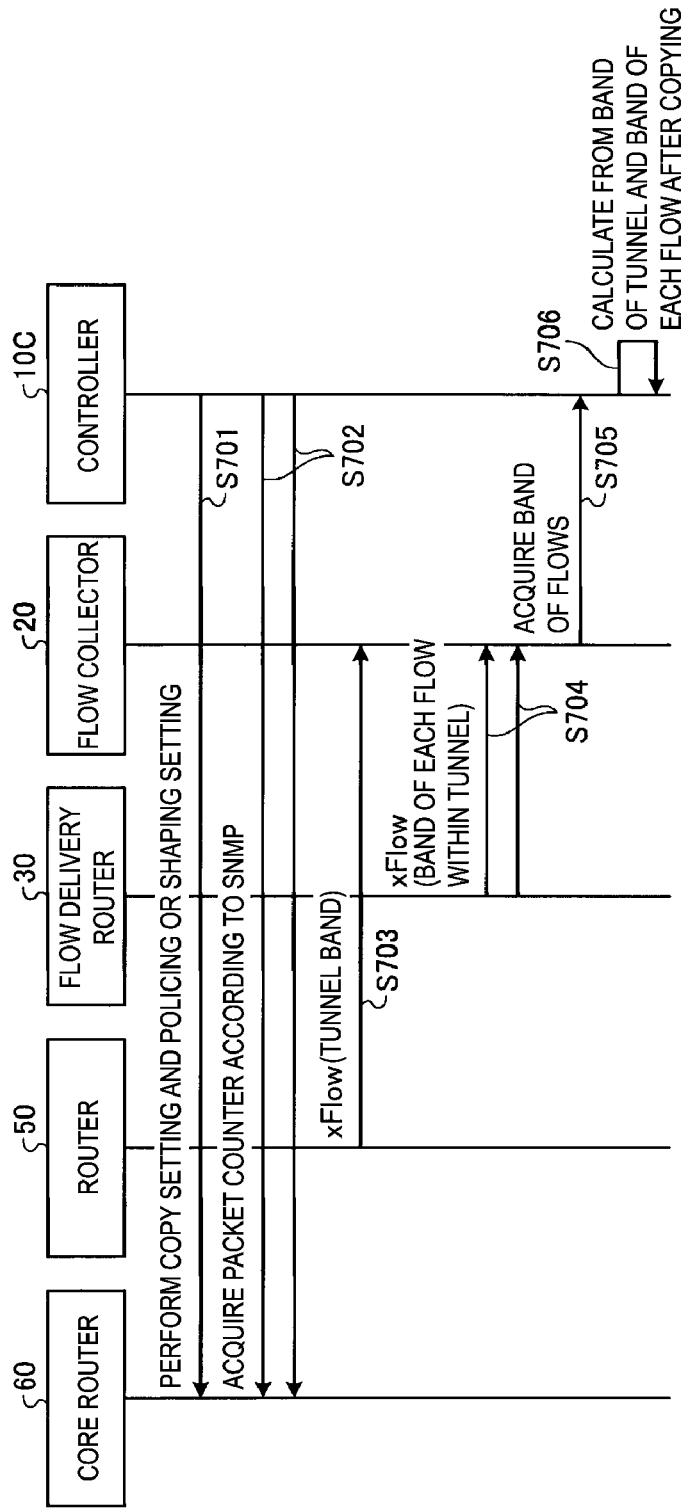
FIG. 20 is a sequence diagram illustrating processing executed by a communication system according to the fourth embodiment.

Next, a flow of processing of the communication system according to the fourth embodiment will be described with reference to FIG. 20. FIG. 20 is a sequence diagram illustrating the processing executed by the communication system according to the fourth embodiment. As illustrated in FIG. 20, the controller 10C performs setting of copying and setting of policing or shaping for the core router 60 (Step S701). Then, the controller 10C acquires the DROP counter according to the SNMP from the core router 60 (Step S702). Then, the controller 10C uses the acquired DROP counter to calculate the tunnel band.

Then, the flow collector 20 acquires from the router 50 the xFlow information of the copied packet after policing or shaping (Step S703). The flow collector 20 also acquires traffic information (e.g., xFlow information) about each flow from the flow delivery router 30 (Step S704). Then, the controller 10C acquires the bands of the flows from the flow collector 20 (Step S705). That is, the controller 10C acquires the band "$y_i$" of each flow after copying and the band "a" after policing or shaping.

Then, the controller 10C calculates the ratio of packet loss based on the band of the tunnel and the band of each flow after copying (Step S706). Using the above example, the controller 10C calculates the ratio of packet loss by dividing the band "A" of the tunnel by the band "a" after policing or shaping, for example. Thereafter, the controller 10C estimates the band "$x_i$" of the copy source traffic of the flow to be monitored by multiplying the band "$y_i$" of the flow to be monitored by the ratio calculated by the calculation unit 12b.

Fifth Embodiment

When the core router has a sampling copy function, the traffic volume before sampling may be estimated using the sampling rate set by the controller. Thus, in following description, a controller 10D according to the fifth embodiment uses the band of flow within the tunnel and the preset policing or shaping band and uses the sampling rate set by the controller 10D to estimate the traffic volume before sampling. Note that description of the same configuration and processing as those of the communication system according to the first embodiment will be omitted.

Figure 21:
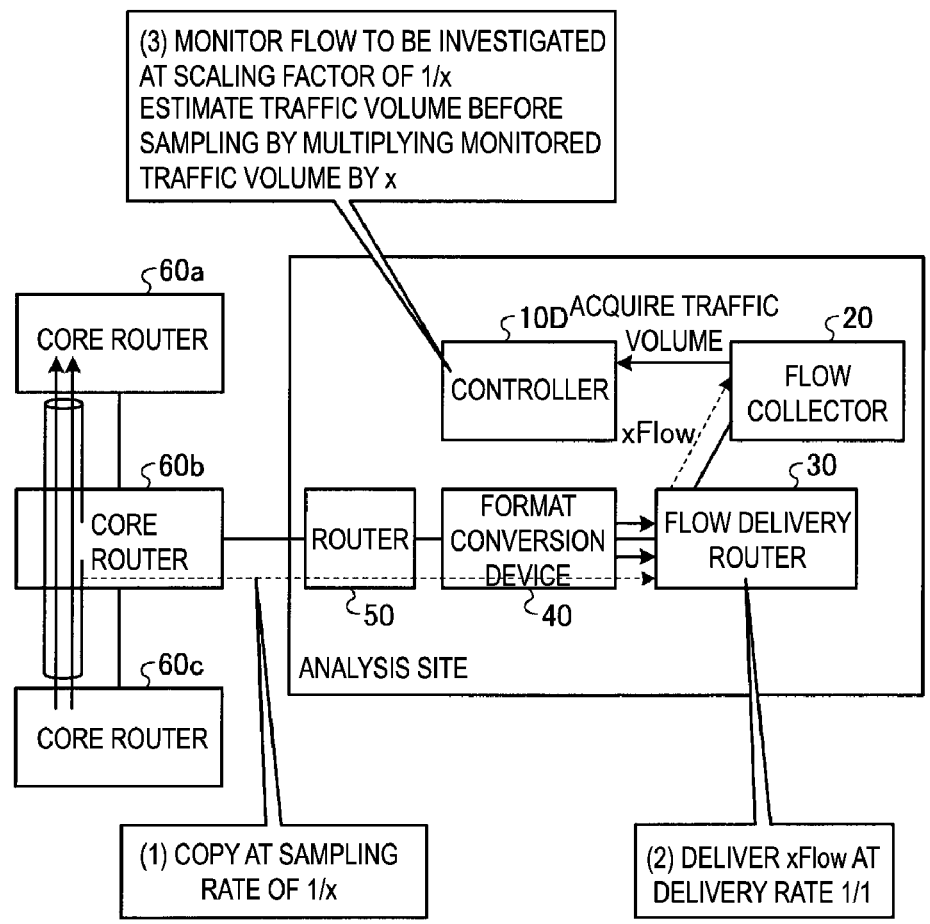
FIG. 21 is a diagram illustrating the outline of processing executed by a communication system according to the fifth embodiment.

FIG. 21 is a sequence diagram illustrating the outline of processing executed by a communication system according to the fifth embodiment. As illustrated in FIG. 21, the core router 60b performs copying at a sampling rate "1/x" and notifies the router 50 of the sampled packet (see FIG. 21 (1)). Then, the flow delivery router 30 transmits xFlow to the flow collector 20 at the delivery rate "1/1" (see FIG. 21(2)).

The flow collector 20 monitors the flow to be monitored (investigated) at a scaling factor "1/x". The controller 10D acquires the band of each flow after sampling, and multiplies the band of the flow to be monitored after sampling among the acquired bands of flows after policing or shaping by an inverse of the sampling rate, thereby estimating the traffic volume of the flow to be monitored within the tunnel. In the example of FIG. 21, the controller 10D estimates the traffic volume before sampling by multiplying the traffic volume by x (see FIG. 21(3)). In this manner, the traffic volume before sampling may be estimated by multiplying the band calculated by the flow collector 20 by the sampling rate.

System Configuration and the Like

Each element of each apparatus illustrated is a functional concept and does not necessarily need to be physically configured as illustrated. That is, the specific form of distribution and integration of each apparatus is not limited to the illustrated form, and all or some of the devices can be configured by being functionally or physically distributed and integrated in any unit, depending on various loads, usage conditions, and the like. Further, all or some of processing functions performed by each apparatus may be implemented by a CPU and a program analyzed and executed by the CPU, or may be implemented as hardware by wired logic.

In addition, among processing described in the embodiments, all or some of processing, which is described as automatically performed processing, can be manually performed, or all or some of processing, which is described as manually performed processing, can be automatically performed by well-known methods. In addition, information including the processing procedures, the control procedures, the specific names, and various data and parameters described in the above-described document and drawings can be optionally changed unless otherwise specified.

Program

A program in which the processing executed by the devices described in the above-described embodiments is described in a computer-executable language can also be created. For example, a program in which the processing executed by the devices in the communication system according to the embodiment and the modification example is described in a computer-executable language can also be created. In this case, when the computer executes the program, the same effects as those of the above-described embodiment can be obtained. Hereinafter, one example of a computer that executes the program will be described.

Figure 22:
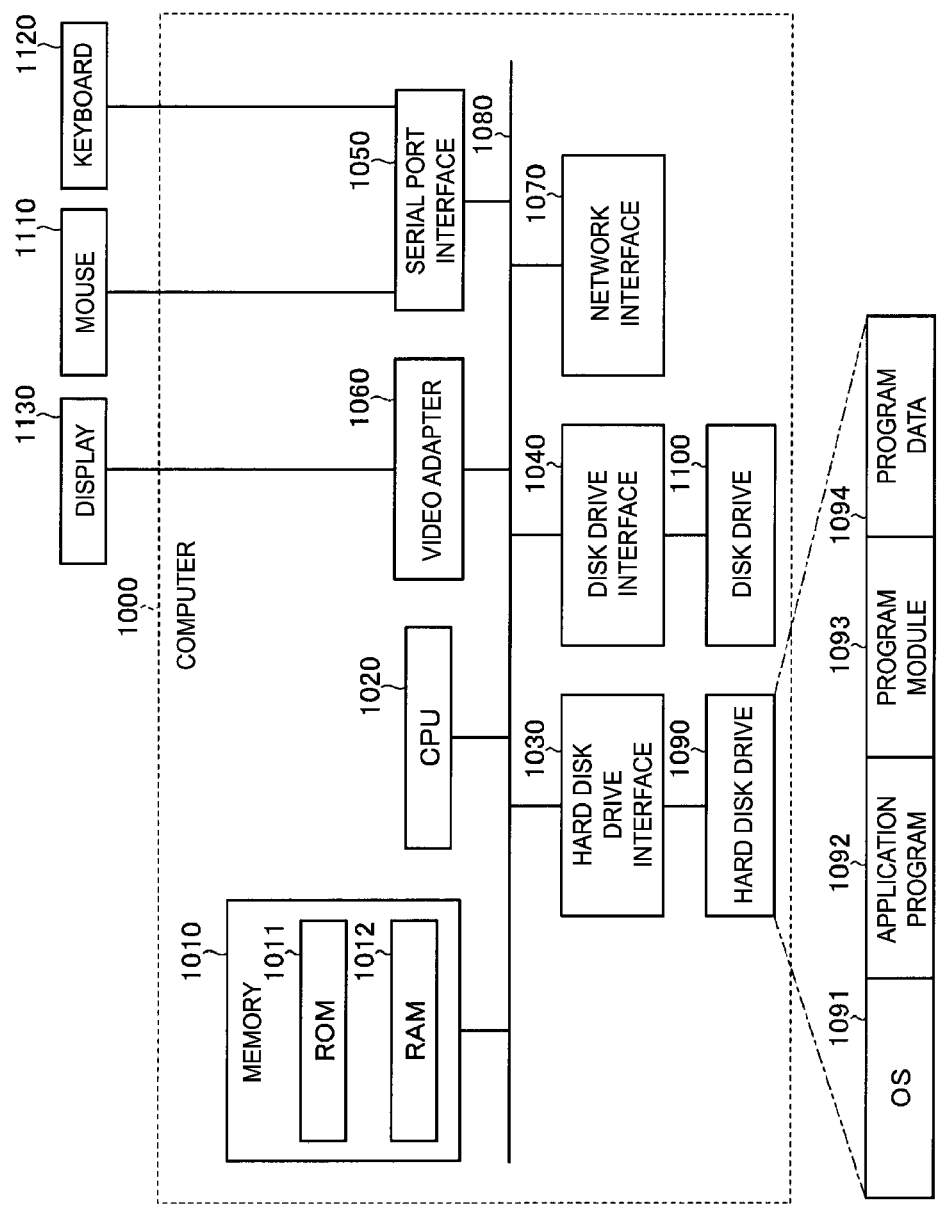
FIG. 22 is a diagram illustrating a computer that executes a program.

FIG. 22 is a diagram illustrating a computer that executes a program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a Read Only Memory (ROM) 1011 and a RAM 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1051 and a keyboard 1052. A video adapter 1060 is connected to, for example, a display 1061.

Here, the hard disk drive 1090 stores, for example, an OS 1091, an application program 1092, a program module 1093, and program data 1094. That is, a program defining each of processes of each apparatus is implemented as the program module 1093 in which computer-executable code is described. The program module 1093 is stored in, for example, the hard disk drive 1090. For example, the program module 1093 for executing the same processing as the functional configuration in each apparatus is stored in the hard disk drive 1090. Note that the hard disk drive 1090 may be replaced with a Solid State Drive (SSD).

Data used in the processing of the above-described embodiment is stored in, for example, the memory 1010 or the hard disk drive 1090, as the program data 1094. In addition, the CPU 1020 reads and executes the program module 1093 and the program data 1094 stored in the memory 1010 and the hard disk drive 1090 to the RAM 1012 as necessary.

Note that the program module 1093 and the program data 1094 are not necessarily stored in the hard disk drive 1090, and may be stored, for example, in a removable storage medium, and read by the CPU 1020 via the disk drive 1100 or its equivalent. Alternatively, the program module 1093 and the program data 1094 may be stored in another computer connected via a network or a WAN. In addition, the program module 1093 and the program data 1094 may be read by the CPU 1020 from another computer through the network interface 1070.

REFERENCE SIGNS LIST 10, 10A, 10B, 10C, 10D Controller
11 Communication processing unit 12 Control unit
12a Acquisition unit
12b Calculation unit
12c Estimation unit
13 Storage unit
13a Traffic volume storage unit
20 Flow collector
30 Flow delivery router
40 Format conversion device
50 Router
60a, 60b, 60c Core router

The invention claimed is:

1. An estimation method for controlling a bandwidth of a data flow performed by an estimation apparatus, the estimation method comprising:
acquiring first information about an aggregated band associated with a plurality of flows of data within a tunnel before shaping, wherein the tunnel allows transmission of the plurality of flows of data in packets between routers within the tunnel;
generating, based on a combination including copying and shaping the plurality of flows of data within the tunnel, a plurality of shaped flows of data;
acquiring, based on the plurality of shaped flows of data, second information about an aggregated band associated with the plurality of shaped flows of data;
acquiring, a traffic volume associated with a shaped flow of the plurality of shaped flows of data;
calculating a ratio between a first aggregated traffic volume based on the first information associated with the aggregated band of the plurality of flows of data within the tunnel and a second aggregated traffic volume based on the second information associated with the aggregated band of the plurality of shaped flows;
estimating, based on a combination including the ratio and the traffic volume associated with the shaped flow of the plurality of shaped flows of data, a traffic volume of a flow of the plurality of flows of data within the tunnel; and
determining, based at least on the estimated traffic volume of the flow of the plurality of flows of data within the tunnel and a predetermined threshold, data representing an attack in a data traffic associated with the flow of the plurality of flows of data within the tunnel.

2. The estimation method according to claim 1, wherein the acquiring the second information about the aggregated band associated with the plurality of shaped flows of data further comprises acquiring a band of each shaped flow of the plurality of shaped flows of data, and
the calculating further comprises calculating the ratio based on the aggregated band of the plurality of flows within the tunnel and the aggregated band of the plurality of shaped flows of data.

3. The estimation method according to claim 1, wherein the acquiring the second information further comprises acquiring a band of the shaped flow of the plurality of shaped flows of data, and
the calculating further comprises calculating the ratio based on the aggregated band of the plurality of flows within the tunnel and a preset shaped band of a shaped flow of the plurality of shaped flows associated with the band of the flow within the tunnel.

4. The estimation method according to claim 1, wherein the acquiring the first information further comprises acquiring a packet counter from a core router configured to count a number of packets in the plurality of flows of data within the tunnel, and
the calculating further comprises: calculating the aggregated band of the plurality of flows within the tunnel using a packet counter, and calculating the ratio by using a band of the flow within the tunnel and a preset shaped band of a shaped flow of the plurality of shaped flows associated with the band of the flow within the tunnel.

5. The estimation method according to claim 1, wherein the acquiring the second information further comprises acquiring a packet counter and a band of the flow after shaping from a core router configured to count a number of packets in the plurality of flows within the tunnel, and
the calculating further comprises: calculating the aggregated band of the plurality of flows within the tunnel using the packet counter, and calculating the ratio by using the aggregated band of the plurality of flows of data within the tunnel and the aggregated band of the plurality of shaped flows of data.

6. The estimation method according to claim 1, the estimation method comprising:
acquiring an aggregated band of the plurality of shaped flows of data; and
estimating, by multiplying a band of a shaped flow in the aggregated band of the plurality of shaped flows of data by an inverse of a sampling rate, the traffic volume of the flow of data within the tunnel.

7. The estimation method according to claim 1, wherein the acquiring the first information is based on Simple Network Management Protocol (SNMP).

8. An estimation apparatus comprising a processor configured to execute a method comprising:
acquiring first information about an aggregated band associated with a plurality of flows of data within a tunnel before shaping, wherein the tunnel allows transmission of the plurality of flows of data in packets between routers within the tunnel;
generating, based on a combination including copying and shaping the plurality of flows of data within the tunnel, a plurality of shaped flows of data;
acquiring, based on the plurality of shaped flows of data, second information about an aggregated band associated with the plurality of shaped flows of data;
acquiring, based on a traffic volume associated with a shaped flow of the plurality of shaped flows of data;
determining a ratio between a first aggregated traffic volume based on the first information associated with the aggregated band of the plurality of flows of data within the tunnel and a second aggregated traffic volume based on the second information associated with the aggregated band of the plurality of shaped flows; and
estimating, based on a combination including the ratio and the traffic volume associated with the shaped flow of the plurality of shaped flows of data, a traffic volume of a flow of the plurality of flows of data within the tunnel; and
determining, based at least on the estimated traffic volume of the flow of the plurality of flows of data within the tunnel and a predetermined threshold, data representing an attack in a data traffic associated with the flow of the plurality of flows of data within the tunnel.

9. The estimation apparatus according to claim 8, wherein the acquiring the second information about the aggregated band associated with the plurality of shaped flows of data further comprises acquiring a band of each shaped flow of the plurality of shaped flows of data, and the calculating further comprises calculating the ratio based on the aggregated band of the plurality of flows within the tunnel and the aggregated band of the plurality of shaped flows of data.

10. The estimation apparatus according to claim 8, wherein
the acquiring the traffic volume associated with the shaped flow further comprises acquiring a band of the shaped flow of the plurality of shaped flows of data, and
the calculating further comprises calculating the ratio based on the aggregated band of the plurality of flows within the tunnel and a preset shaped band of a shaped flow of the plurality of shaped flows associated with the band of the flow within the tunnel.

11. The estimation apparatus according to claim 8, wherein
the acquiring the first information further comprises acquiring from a core router a number of packets in the plurality of flows of data within the tunnel, and
the calculating further comprises calculating the aggregated band of the plurality of flows within the tunnel based on a combination of the number of packets, the ratio, and a preset shaped band of a shaped flow of the plurality of shaped flows associated with a band of the flow within the tunnel.

12. The estimation apparatus according to claim 8, wherein
the acquiring the first information about the aggregated band associated with the plurality of flows of data further comprises acquiring from a core router a number of packets in the plurality of flows within the tunnel, and
the calculating further comprises calculating the aggregated band of the plurality of flows within the tunnel based on a combination of the number of packets, the ratio, and the aggregated band of the plurality of shaped flows of data.

13. The estimation apparatus according to claim 8, the method further comprising:
acquiring an aggregated band of the plurality of shaped flows of data; and
estimating, by multiplying a band of a shaped flow in the aggregated band of the plurality of shaped flows to of data by an inverse of a sampling rate, the traffic volume of the flow of data within the tunnel.

14. The estimation apparatus according to claim 8, wherein the acquiring the first information is based on Simple Network Management Protocol (SNMP).

15. A computer-readable non-transitory recording medium storing computer-executable instructions that when executed by a processor cause a computer system to execute a method comprising:
acquiring first information about an aggregated band associated with a plurality of flows of data within a tunnel before shaping, wherein the tunnel allows transmission of the plurality of flows of data in packets between routers within the tunnel;
generating, based on a combination including copying and shaping the plurality of flows of data within the tunnel, a plurality of shaped flows of data;
acquiring, based on the plurality of shaped flows of data, second information about an aggregated band associated with the plurality of shaped flows of data;
acquiring, a traffic volume associated with a shaped flow of the plurality of shaped flows of data;
calculating a ratio between a first aggregated traffic volume based on the first information associated with the aggregated band of the plurality of flows of data within the tunnel and a second aggregated traffic volume based on the second information associated with the aggregated band of the plurality of shaped flows;
estimating, based on a combination including the ratio and the traffic volume associated with the shaped flow of the plurality of shaped flows of data, a traffic volume of a flow of the plurality of flows of data within the tunnel; and
determining, based at least on the estimated traffic volume of the flow of the plurality of flows of data within the tunnel and a predetermined threshold, data representing an attack in a data traffic associated with the flow of the plurality of flows of data within the tunnel.

16. The computer-readable non-transitory recording medium of claim 15, wherein
the acquiring the second information about the aggregated band associated with the plurality of shaped flows of data further comprises acquiring a band of each shaped flow of the plurality of shaped flows of data, and
the calculating further comprises calculating the ratio based on the aggregated band of the plurality of flows within the tunnel and the aggregated band of the plurality of shaped flows of data.

17. The computer-readable non-transitory recording medium of claim 15, wherein
the acquiring the second information further comprises acquiring a band of each shaped flow of the plurality of shaped flows of data, and
the calculating further comprises calculating the ratio based on the aggregated band of the plurality of flows within the tunnel and a preset shaped band of a shaped flow of the plurality of shaped flows associated with the band of the flow within the tunnel.

18. The computer-readable non-transitory recording medium of claim 15, wherein
the acquiring the first information further comprises acquiring from a core router a number of packets in the plurality of flows of data within the tunnel, and
the calculating further comprises calculating the aggregated band of the plurality of flows within the tunnel based on a combination of the number of packets, the ratio, and a preset shaped band of a shaped flow of the plurality of shaped flows associated with a band of the flow within the tunnel.

19. The computer-readable non-transitory recording medium of claim 8, wherein
the acquiring the first information further comprises acquiring from a core router a number of packets in the plurality of flows within the tunnel, and
the calculating further comprises calculating the aggregated band of the plurality of flows within the tunnel based on a combination of the number of packets, the ratio, and the aggregated band of the plurality of shaped flows.

20. The computer-readable non-transitory recording medium of claim 15, the computer-executable instructions when executed further causing the system to execute a method comprising:
acquiring the aggregated band of the plurality of shaped flows of data; and
estimating, by multiplying a band of a shaped flow in the aggregated band of the plurality of shaped flows of data by an inverse of a sampling rate, the traffic volume of the flow of data within the tunnel.

* * * * *